(12) United States Patent
Lancaster, III et al.

(10) Patent No.: US 8,145,350 B2
(45) Date of Patent: Mar. 27, 2012

(54) METHOD AND SYSTEM FOR BUILDING A LOAD

(75) Inventors: Patrick R. Lancaster, III, Louisville, KY (US); Curtis W. Martin, New Albany, IN (US); Terry L. Wilson, Crestwood, KY (US)

(73) Assignee: Lantech.com, LLC, Louisville, KY (US)

( * ) Notice: Subject to any disclaimer, the term of this patent is extended or adjusted under 35 U.S.C. 154(b) by 2515 days.

(21) Appl. No.: 10/696,736

(22) Filed: Oct. 30, 2003

(65) Prior Publication Data

US 2004/0129150 A1  Jul. 8, 2004

Related U.S. Application Data

(60) Provisional application No. 60/422,875, filed on Nov. 1, 2002.

(51) Int. Cl.
*B65G 59/02* (2006.01)
(52) U.S. Cl. ............ 700/217; 700/258; 414/796.9; 414/791.8
(58) Field of Classification Search ............ 700/217, 700/218, 245, 258, 259; 414/792.6, 792.7, 414/792.9, 794.6, 788.1, 790.2, 800–802
See application file for complete search history.

(56) References Cited

U.S. PATENT DOCUMENTS

| | | | | |
|---|---|---|---|---|
| 3,586,176 A | * | 6/1971 | Rackman et al. ............ 414/792 |
| 4,287,459 A | * | 9/1981 | Dahlstrom ............ 318/568.14 |
| 4,419,035 A | * | 12/1983 | Stobb ............ 414/791.6 |
| 4,519,740 A | * | 5/1985 | Stobb ............ 414/791.6 |
| 4,658,715 A | * | 4/1987 | Stobb ............ 100/2 |
| 4,694,232 A | * | 9/1987 | Suzuki et al. ............ 318/568.13 |
| 4,993,915 A | * | 2/1991 | Berger et al. ............ 414/796.9 |
| 4,995,224 A | * | 2/1991 | Yourgalite et al. ............ 53/540 |
| 5,098,254 A | * | 3/1992 | Becicka et al. ............ 414/792.9 |
| 5,163,808 A | * | 11/1992 | Tsubone et al. ............ 414/791.8 |

(Continued)

FOREIGN PATENT DOCUMENTS

GB   2 212 489 A   10/1989

OTHER PUBLICATIONS

Results of a Partial International Search Report for International Application No. PCT/US03/34732, dated Apr. 14, 2004.

*Primary Examiner* — James R Bidwell
(74) *Attorney, Agent, or Firm* — Wood, Herron & Evans, LLP

(57) ABSTRACT

A palletizer for automatically building a load with product from an infeed area is disclosed. It includes means for defining a desired volume of a load including a length sensor, a width sensor, and a height sensor. It also includes means for transporting product from an infeed area to the load. A controller is associated with means for defining the desired volume, the controller being configured to receive signals from the sensors and to automatically control movement of the means for transporting. The controller is configured to automatically determine when the volume is filled. In another aspect, a method of building a load with product from an infeed area is provided. The method includes defining a desired volume of the load using a length sensor, a width sensor, and a height sensor. It also includes automatically filling the volume with product, and determining when the volume is filled.

65 Claims, 11 Drawing Sheets

U.S. PATENT DOCUMENTS

| | | | |
|---|---|---|---|
| 5,169,284 A | * 12/1992 | Berger et al. | 414/796.9 |
| 5,249,917 A | * 10/1993 | Neumann et al. | 414/799 |
| 5,582,504 A | * 12/1996 | Cestonaro | 414/796.9 |
| 5,738,484 A | * 4/1998 | Taylor | 414/788.1 |
| 5,842,827 A | * 12/1998 | Kwasniewski et al. | 414/802 |
| 5,873,214 A | * 2/1999 | Moore et al. | 53/399 |
| 5,961,275 A | * 10/1999 | Winski et al. | 414/792.6 |
| 2002/0106273 A1 | 8/2002 | Huang et al. | |

* cited by examiner

METHOD AND SYSTEM FOR BUILDING A LOAD

This application claims the benefit of priority under 35 U.S.C. §119 to U.S. Provisional Application No. 60/422,875, filed Nov. 1, 2002, the complete disclosure of which is incorporated herein by reference.

FIELD OF THE INVENTION

This invention relates to a method and system for loading a pallet with product from an in-feed area.

BACKGROUND OF THE INVENTION

Palletizers are used to load pallets with cartons, bags, bundles, or other packages. Some standard types of palletizers include stripper plate palletizers, pick and place palletizers, and row picker palletizers. A stripper plate palletizer builds a palletized load a full layer at a time. Typically, it builds the layer on a plate, and the entire layer is then pushed off the plate onto a pallet by a stripper mechanism. A pick and place palletizer builds a palletized load one product unit at a time. It may include a gantry and/or robotic arm that picks up the product unit and then places the product unit in the proper location on the load. A row picker palletizer builds a palletized load one row at a time. It uses a row securing system, such as a clamp, to pick up, transport, and place a single, complete row of product on the pallet.

Regardless of the type, palletizers are typically programmed with a loading sequence to build the load. The palletizers follow the sequence to place one product unit, or one set of product units, at a time in a location on the pallet specifically programmed in the sequence. Accordingly, the palletizer follows one part of the sequence to place a first product unit in a first location, and follows a second part of the sequence to place a second product unit in a second location. When the palletizer has followed the complete sequence, placing product units in each assigned location, the palletized load is complete. Typically, the sequence counts the numbers of product units in a row, the number of product units in a layer, and the number of layers in the palletized load. For example, a pick and place palletizer may be programmed to build a row on the palletized load by following a sequence five times to complete the row having five product units.

Often, product manufacturers use a single palletizer to load different sized products at different times. To do this, the palletizer must be adapted to changeover from one product to another, and build palletized loads with the different sized products. Because building the load requires that product units to be placed in assigned locations, changeover from one size or shape of product to another typically requires a new computer program setting forth a new sequence for the product, which is determined by the size and shape of the product. Accordingly, when the product size is changed, or the orientation of the product is changed, the sequence must also be changed. For example, if the palletizer is set to load twelve inch product units, then loading product either larger or smaller than twelve inches may cause either interference between the product units, or gaps between the product units on the palletized load unless the sequence program is changed.

Preparing and programming a new sequence for each change in product size can be an expensive and a complex procedure, furthermore, frequent changeover using complex systems can be prone to errors and may result in downtime and/or other inefficiencies.

The present invention overcomes one or more of the deficiencies in the prior art.

SUMMARY OF THE INVENTION

In the following description, certain aspects and embodiments of the present invention will become evident. It should be understood that the invention, in its broadest sense, could be practiced without having one or more features of these aspects and embodiments. It should also be understood that these aspects and embodiments are merely exemplary.

As embodied and broadly described herein, one aspect of the invention is directed to a method of building a load with product from an infeed area. It includes defining a desired volume or area of the load using sensors, such as a length sensor, a width sensor, and a height sensor. The method includes automatically filling the volume with product and determining when the volume is filled.

In one aspect, defining the desired volume may include positioning at least one of the length sensor, the width sensor, and the height sensor to define at least one of the respective length, width, and height of the volume. It may also include positioning the width sensor and the height sensor to define the desired width and desired height of the desired volume of the load.

In one aspect, filling the volume includes sensing the location of product previously placed on the load. It may further include transporting new product with a transporting means to a location adjacent the sensed location of the previously placed product on the load.

In another aspect, defining the desired volume may include setting a desired height of the load by adjusting the positioning of the height sensor, setting a desired length of the load by positioning of the length sensor. In another aspect, defining the desired volume includes setting a desired width of the load by positioning of the width sensor. Positioning of the length sensor may include adjusting the position of the length sensor to define the length of a product row on a conveyer.

In yet another aspect, the transporting means may include a product holder configured to place the product within the desired volume. Filling the volume with product may include monitoring the location of the product holder relative to the load. Monitoring the location of the product holder may include sensing previously placed product below the product holder. Monitoring the location of the product holder may include sensing previously placed product to the side of the product holder. In another aspect, filling the volume with product further may include moving the product holder above and next to previously placed product, as sensed by at least one sensor, and depositing the product from the product holder next to and on top of the previously placed product.

In another aspect, filling the volume with product may include transporting a row of product at a first speed for a first portion of a journey from a product conveyor to the load. It may also include transporting the row of product at a second, relatively slower speed during a second portion of a journey from the product conveyor to the load. In yet another aspect, filling the volume with product may include executing a logic sequence in a controller for at least two consecutive transporting cycles.

In yet another aspect, the transporting means may include a product holder configured to place the product within the volume, and a horizontal support and a vertical support configured to support the product holder. The method may also include monitoring the position of the horizontal support relative to the vertical support to determine when the load reaches the desired height. Monitoring the position of the product holder relative to the horizontal support to determine when the load reaches a desired width. The method may also include monitoring product on a product conveyer to determine when the product forms a product row of the desired length.

In yet another aspect, determining when the volume is filled may include monitoring at least two of the length, the width, and the height sensors for a signal indicating that at least two of the desired length, the desired width, and the desired height are of the load reached. It may also include receiving a signal from the at least two monitored sensors at a controller. The method may also include pushing a completed load from a loading zone of a palletizer. In another aspect, automatically filling the volume includes one of placing a product unit on the load to build a row, placing a product row on the load to build a layer, and placing a product layer on the load to build the load.

In another aspect, the invention is directed to a method of building a load with product from an infeed area. It includes defining a desired height of a load using a height sensor and defining a desired length of the load using a length sensor. The desired height and the desired length of the load may define a desired area of a load to be filled with the product.

In yet another aspect, filling the desired area includes sensing the location of the pallet. It may also include depositing the product upon the sensed location of the product previously placed on the load.

In another aspect, the invention is directed a method of building a load with product from an infeed area. It may include automatically moving a product from the infeed area to a load building area, automatically depositing the product on the load, automatically repeating the moving and depositing steps by repeating a single logic sequence for at least two consecutive moving and depositing steps, and automatically determining when the load is completely built.

In one aspect, automatically moving and automatically depositing steps may define a transporting cycle, and wherein a controller executes the single logic sequence for each transport cycle of the load. In another aspect, the logic sequence is defined in computer executable code configured to be executed by a processor.

In yet another aspect, repeating the automatically moving and automatically depositing steps includes loading a first product having a first size onto a load and loading a second product having a second size onto the same load.

In yet another aspect, repeating the single logic sequence for at least two consecutive moving and depositing steps may include moving and depositing a first product having a first size in first moving and depositing steps. It may also include moving and depositing a second product having a second size in second, successive moving and depositing steps. It may include building a second load with second product having a second size, different than the size of the first product, wherein when building the second load, a controller repeats the single logic sequence.

In yet another aspect, the method includes defining a desired volume of the load by at least one of a width sensor, a length sensor, and a height sensor to define a desired width, a desired length, and a desired height of the desired volume of the load.

In another aspect, the invention is directed to a method of building a load with product from an infeed area. It may include defining a desired area of the load to be filled. Defining a desired area may include providing adjustable first and second sensors to define the area.

In another aspect, the invention is directed to a palletizer for automatically building a load with product from an infeed area. It may include means for defining a desired volume of a load including a length sensor, a width sensor, and a height sensor. It also may include means for transporting product from the infeed area to the load. Further, it may include a controller associated with means for defining the desired volume. The controller may be configured to receive signals from the sensors and to automatically control movement of the means for transporting. The controller may be configured to automatically determine when the volume is filled.

In another aspect, the invention is direct to a palletizer for building a load with product from an infeed area. it includes means for transporting the product from the infeed area to a position on a load, wherein transportation of the product from the infeed area to the load is a transporting cycle. It may also include a controller configured to control the movement of the transporting means to convey the product and deposit the product on the load, wherein the controller is configured to repeat the logic sequence for at least two consecutive transporting cycles, and wherein the controller is configured to determine when the load is completely built. In one aspect, the controller may include a computer processor. The logic sequence may be defined in computer executable code configured to be executed by the processor.

In one aspect, the means for transporting product is a three-axis system for placing a product unit on the load. In another aspect, it is a two-axis system for placing a row of product on the load.

In yet another aspect, the invention is directed to a system for building and wrapping a load. It may include a palletizer for building a load with product from an infeed area and a packaging material dispenser associated with the palletizer for wrapping the load. It may also include means for providing relative rotation between the packaging material dispenser and the load.

In one aspect, a controller is configured to control the movement of the transporting means to convey and place a first product having a first size, and convey and successively place a second product having a second size while repeating the same logic sequence.

In another aspect, a method for building and wrapping a load includes transporting product from an infeed area to a load building area and depositing the product on a load based upon the sensed location of the previously placed product. It may also include repeating the transporting and depositing logic sequence for consecutive transporting cycles to build the load and wrapping the load with a packaging material dispenser.

In another aspect, the invention is directed to a method of building a load with product from an infeed area. It includes defining a desired volume of the load using a length sensor, a width sensor, and a height sensor. The volume is automatically filled with product by executing a first logic sequence in a controller, and repeating the first logic sequence for at least two transporting cycles. A second logic sequence is executed in the controller for a different transporting cycle while building the load. The method also includes determining when the volume is filled.

In another aspect, the method includes defining a desired area of a load to be filled with product using at least two of a height sensor, a length sensor, and a width sensor.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The foregoing and other features and advantages of the invention will be apparent from the following more particular description of the invention, as illustrated in the accompanying drawings.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

The present invention relates to a system and method for building a product load on a pallet using a palletizer. The palletizer may operate to fill a predefined volume with product to create the palletized load. The volume may be determined based upon a desired row length, a desired layer width, and a desired load height. Sensors are used to delineate the boundaries for row length, layer width, and load height. These may be adjusted by changing the location of sensors that indicate the limits of the length, width, and height. Therefore, the palletizer may fill the volume by depositing product on the palletized load until the sensors indicate that the volume is filled. Accordingly, the palletizer of the present invention may be configured to build a palletized load based on the palletized load volume and not based on the product size.

Building a palletized load based on the volume of the load, rather than the product size, eliminates the need to have a different program sequence for each different size of products, as is required by conventional palletizers. To build the palletized load, the present invention follows the same program sequence regardless of the size of the product, and continues to build until the pre-defined volume is filled. Because of this, the palletizer can build a palletized load using products having different dimensions or orientations in each row, layer, or load, without the need to use different program sequences. For example, a load built according to the present invention may have a first layer with one product size and a second layer with a second different product size, without different programming sequences for each layer.

The placement of products having different sizes may be accomplished without changing over the programming system and/or making large and difficult changes to the machine structure. Thus, the palletizer of the present invention is efficient, easy to use, and eliminates the need for separate programming for each size of product. Because of this, operating costs are reduced, resulting in savings to product manufacturers. Thus, the palletizer is more versatile, more cost effective, and simpler to use than palletizers known in the art.

Figure 1:
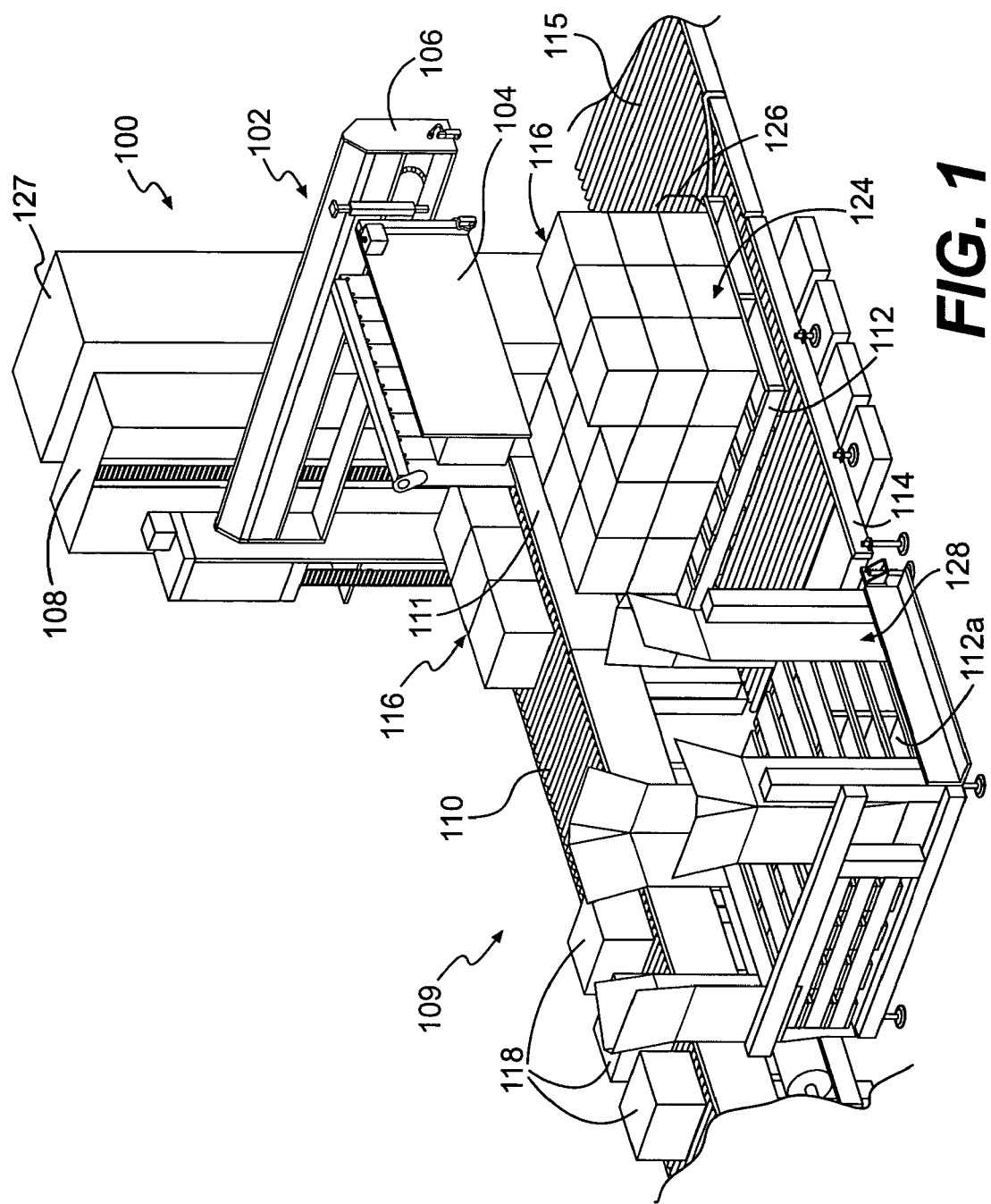
FIG. 1 is a pictorial representation of an exemplary palletizer according to one aspect of the present invention.

According to one aspect of the present invention, a palletizer 100 is provided for loading a pallet with product, as shown in FIG. 1. The palletizer 100 includes a transporting system 102, which may include an arm 106, a mast 108, and a product holder, such as a clamp 104. As shown in FIG. 1 and embodied herein, the palletizer 100 may be located near, and include, a product infeed conveyer 110, and may operate in conjunction with a pallet conveyer 114. In this embodiment, the palletizer 100 is a row picker palletizer. However, the present invention may be used with other types of palletizers, including both two-axis and three-axis palletizers. For example, in one embodiment, the palletizer 100 is 3-axis palletizer that uses the inventive principles set forth below to place product units on a pallet load, one unit at a time. The palletizer 100 could be any type of palletizer, including, but not limited to, stripper plate palletizers, and pick and place palletizers.

In this specification, the term "automatic" is intended to be defined as done or accomplished by a machine. Accordingly, it is intended to mean not manually done by hand. Also, the term "activated" or "open" is used to indicate that a sensor senses a change in the status quo. For example, it could mean the sensor senses an object that was not previously in that location, or alternatively, senses that an object previously sensed is no longer being sensed.

Figure 4:
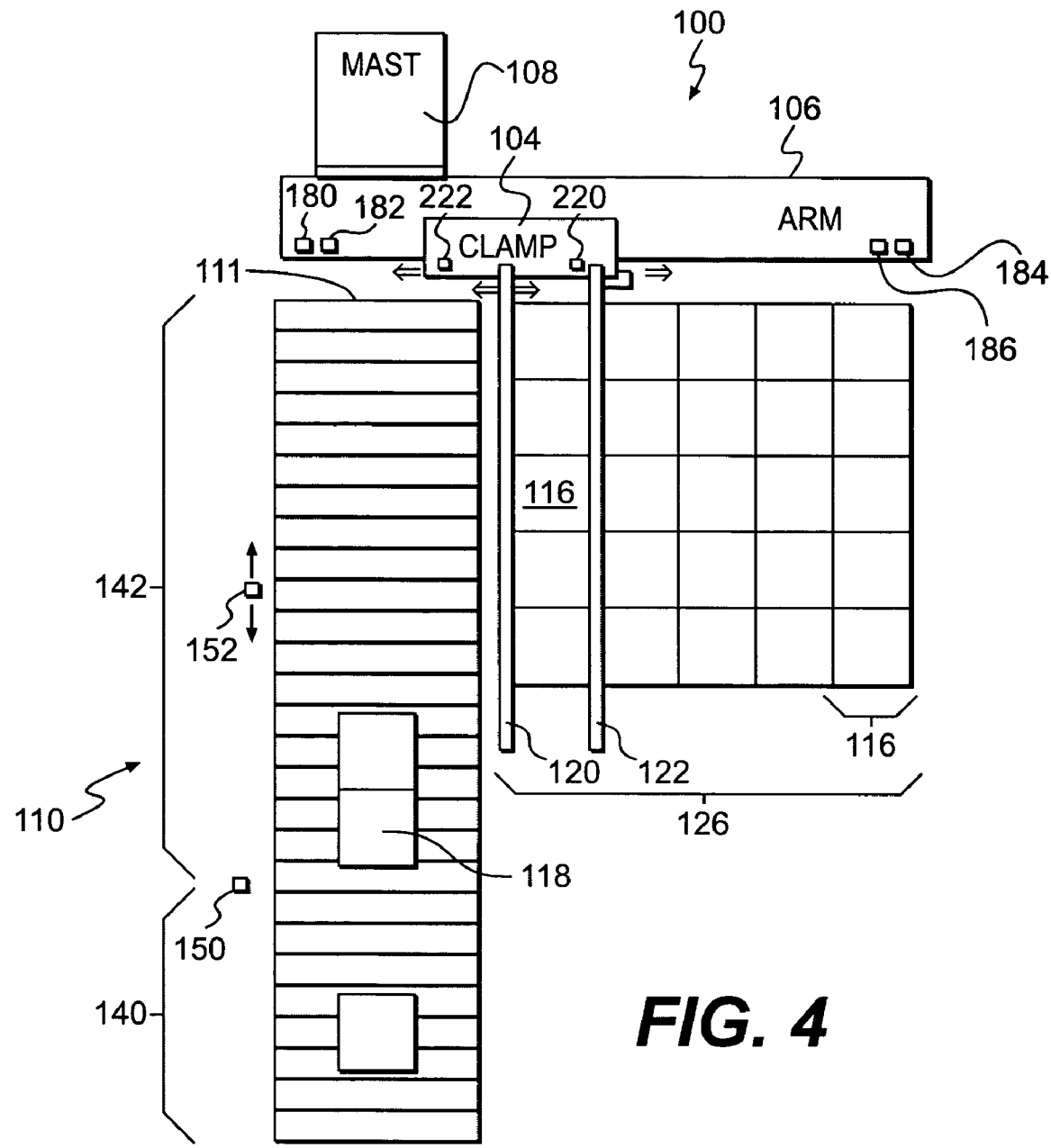
FIG. 4 is a schematic showing a top view of the exemplary palletizer of FIG. 3.

As shown in FIG. 4, the clamp 104 may include a first moveable grip 120 and a second fixed grip 122. When clamping product, the product may be positioned on a conveyor between the moveable and fixed grips 120 and 122. The movable grip 120 is then moved toward the fixed grip 122, thereby pinning the product between the two grips 120 and 122. Although the invention is described with reference to the clamp 104, other product holders could be used with a palletizer of the present invention. These product holders could be, for example, a vacuum system for lifting and transporting products to a pallet, a clamp having two moveable grips, a shelf, table or platform or other product holders known in the art.

The movable grip 120 and the fixed grip 122 form the clamp 104, which may be attached to the arm 106 in a manner that allows the clamp 104, including both the movable grip 120 and the fixed grip 122, to move along a length of the arm 106 in a substantially horizontal direction. The arm 106 may be attached to the mast 108 in a manner that allows the arm 106 to travel substantially vertically on the mast 108. Accordingly, the arm 106 and the mast 108 provide horizontal and vertical support to the clamp 104. In the embodiment shown, the arm 106 is a cantilever extending from the mast 108, however, other configurations could be used. Movement of the clamp 104 along the arm 106 and of the arm 106 along the mast 108 maybe accomplished using methods currently known in the art.

The product infeed conveyor 110 may be used in an in-feed area 109 for feeding manufactured product to the palletizer 100. It may be, for example, a roller conveyor and the rollers may be either driven or non-driven, as would be apparent to one skilled in the art. Any type of conveyor or other product mover could be used, including a belt conveyor. Also, the pallet conveyor 114 may be a roller conveyor, a belt conveyor, or other conveyor, as is known in the art.

The palletizer 100 is configured to transport product from the product infeed conveyor 110 to a pallet 112 located on the pallet conveyor 114. In the exemplary embodiment shown in FIG. 1, product rows 116, comprising individual product units 118, are placed on the pallet 112 by the transporting system 102. The product rows 116 form product layers 126 on the pallet.

As shown in this exemplary embodiment, product units 118 move on the infeed conveyor 110 to a conveyor end 111, where the product units 118 are indexed into a product row 116. The product units 118 may be of any type, including, for example, cartons, bags, or bundles. The transporting system 102 repeatedly conveys product rows 116 to the pallet 112. In this specification, moving product to the pallet 112 is referred to as building a load. Likewise, a pallet having a product on it is referred to herein as a load, or a palletized load, shown by reference numeral 124 in FIG. 1. Once a pallet 112 is completely loaded, the palletized load 124 may be moved along the conveyor 114 from the loading area. In one embodiment, a packaging material dispenser 127 may be included for subsequent wrapping of the complete palletized load. The packaging material dispenser 127 may dispense a sheet of packaging material in a web form, such as stretch-wrap packaging material to be wrapped around the load. Various other packaging materials, generally not considered to be stretch-wrap materials, such as netting, strapping, banding, and tape, can be used as well. It should also be noted that the load need not be built on a pallet, but could be built on a sheet, the floor, or other base.

The palletizer 100 may also include means for providing relative rotation between the dispenser 127 and the palletized load 124 to wrap packaging material around the sides of the load. The means for providing relative rotation may include a rotatable turntable 115, a wrapping arm, or ring to rotate the dispenser around the load.

In the exemplary embodiment shown in FIG. 1, a pallet dispenser 128 is associated with the pallet conveyor 114. Accordingly, when a complete palletized load is moved off the pallet conveyor 114, a new empty pallet 112a may be moved from the dispenser 128 onto the pallet conveyor 114 for subsequent loading with product by the transporting system 102.

Figure 2:
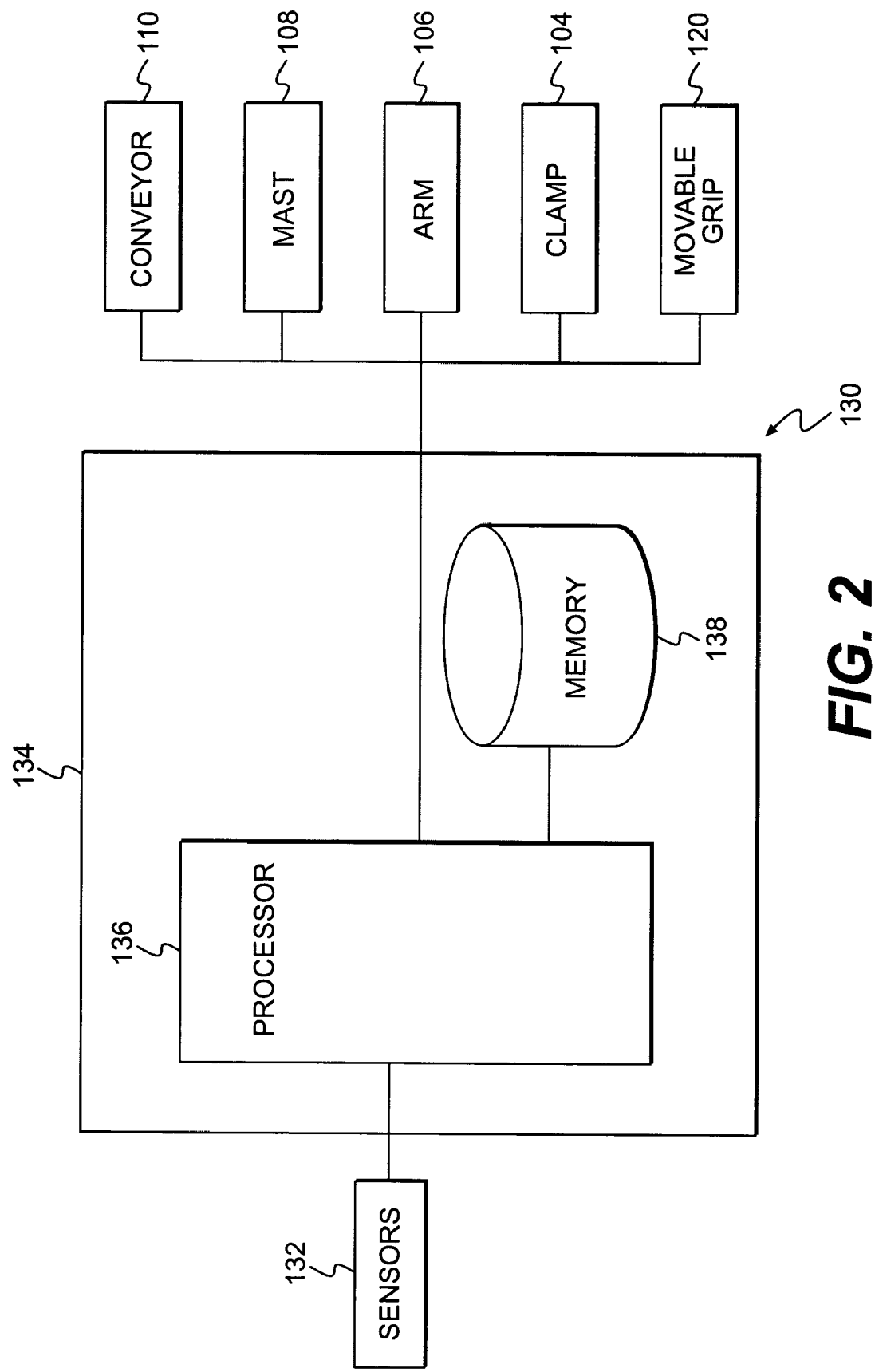
FIG. 2 is a block diagram showing a control system for controlling the palletizer of FIG. 1.

FIG. 2 is a block diagram of an exemplary control system 130 associated with the palletizer 100. The control system 130 enables an operator to choose a desired palletized load volume, and controls the palletizer 100 to place product on the pallet 112 until the palletized load fills the desired volume. The control system 130 may include sensors 132 operably associated with a controller 134. The controller 134 may be configured to send control signals to the product infeed conveyer 110 and components of the transporting system 102, including the clamp 104, the arm 106, the mast 108, and the moveable grip 120.

The position of the sensors 132 may be adjusted to define the desired volume of a palletized load. The control system 130 controls the palletizer 100 to build a palletized load that fills the defined volume, regardless of the size or shape of the individual product units making up the load.

As shown in FIG. 2, the controller 134 includes a processor 136 and a memory component 138. The processor 136 may be any standard processor capable of executing data structure, data sequences, and/or computer programs. The memory component 138 may be any memory component associated with the processor 136 for storing information as data structures, data sequences, and/or computer programs. The data structures, data sequences, and/or computer programs may be sequences of data structures or computer executable program code, and may be routines or subroutines within the structures or code. The processor 136 and the memory component 138 may be any standard processor and memory component known in the art.

The controller 134 may be configured to execute a logic sequence for each cycle of moving and/or placing a product row 116 to the palletized load 124. A logic sequence may be, for example, a routine or a sub-routine followed or executed by the controller 134 to move and place the product rows 116 on the pallet 112. In one exemplary embodiment, the controller 134 executes the same logic sequence when moving and/or placing a product row for two consecutive cycles, or for each consecutive or successive cycle when building a load. Accordingly, it is not necessary to program each individual location that product is to be placed.

The sensors 132 may include any number of sensors necessary for determining the information needed to execute the data structure, data sequences, and/or programs stored in the memory component 138. The sensors 132 may include different types of sensors, including, for example, proximity sensors, infrared sensors, and photocell sensors. Other sensors may be used as would be apparent to one in the art.

The sensors 132 are distributed about the palletizer 100 and/or the infeed area 109. They may be configured to measure or otherwise sense the position of product units 118, the pallet 112, product on the pallet, and the transporting system 102. The sensors 132 may also sense other elements of the system.

As stated above, the controller 134 is also associated with the transporting system 102 for operating the conveyor 110, the mast 108, the arm 106, and the clamp 104 including movable grip 120. The controller 134 may be configured to apply information obtained from the sensors 132 as inputs into the data structures, sequences, and/or programs for execution by the processor 136. Output information, based upon the sensor information, may be sent from the processor 136 to control the movement of the conveyor 110, mast 108, arm 106, or clamp 104. Signal conditioners may be used with the sensors 132 or inside the controller 134 to filter, amplify or otherwise monitor the sensor signals, as is known in the art. It should be noted that the controller may include more than one processor, that may be distributed at separate locations about the palletizer 100. These may be used to control the separate components of the transporting system 102.

The memory component 138 may contain data structures, sequences, and/or programs for controlling movement of the product conveyor 110, mast 108, arm 106, and clamp 104, based on signals received from the sensors 132. Furthermore, the data structures, sequences, and/or programs within the memory component 138 may be configured to control the movement of these palletizer components to fill a predefined volume with product units 118. The volume may be defined, for example, by the adjustable position of a length sensor, a width sensor, and a height sensor.

Figure 3:
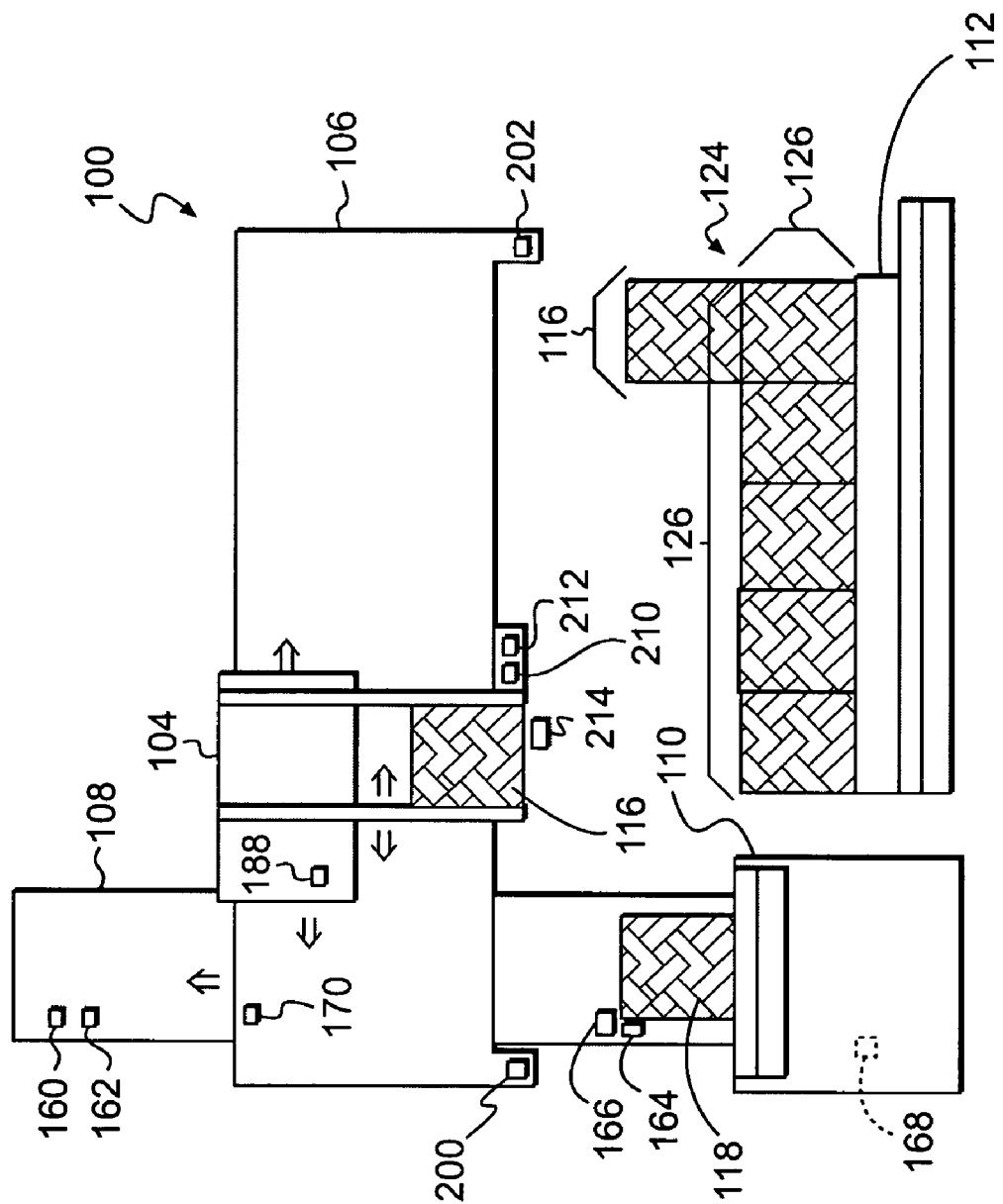
FIG. 3 is a schematic showing a front view of an exemplary palletizer according to one aspect of the present invention.

FIGS. 3 and 4 are schematics of a front view and a top view, respectively, of the palletizer 100, including the conveyor 110. As shown, the palletizer 100 includes the mast 108, the arm 106, the clamp 104, and may include the product conveyer 110. Arrows indicate that the clamp 104 may move horizontally along the arm 106, and the arm 106 may move vertically along the mast 108. A palletized load 124, having product rows 116, is shown in the loading area of the palletizer 100. Multiple product rows 116 make a product layer 126.

FIGS. 3 and 4 also show the location of sensors 132 placed around and associated with the product conveyor 110 and the palletizer 100. The sensors 132 associated with the product infeed conveyor 110 may be used to set a desired length of a product row 116, to be picked up and placed by the palletizer 100. The sensors 132 associated with the palletizer 100 may be used to determine the position of the moving components of the palletizer 100 with respect to the sensed location of the other components, and the product.

For the purpose of explanation, the conveyor operation and sensors are discussed first, followed by a discussion of the palletizer operation and sensors. For clarity, the palletizer sensors are divided into categories of sensors that determine the position or operation of the various components of the palletizer 100. These categories include: the mast-arm sensors; the arm-clamp sensors; the clamp-grips sensors; the product-arm sensors; and product-clamp sensors. All these sensors collectively, including the sensors associated with the product conveyor 110, are represented in FIG. 2 as sensors 132. It should be noted that any sensor that is used to detect the position of one component relative to another component could be located on either component. As such, the positions of the sensors discussed below is for some exemplary embodiments, while other embodiments are also contemplated.

Conveyor Operation

With reference to FIG. 4, the product infeed conveyor 110 may include a stop-space conveyor 140 and a row formation conveyor 142. The stop-space conveyor 140 and the row formation conveyor 142 are situated such that product units 118 may pass from the stop-space conveyor 140 to the row formation conveyor 142. The stop-space conveyor 140 may transport product from a manufacturing location to the palletizer 100. The row formation conveyor 142 receives the product from the stop-space conveyor, and is configured to form a product row 116 to be placed on the pallet 112.

A stop-space sensor 150 and an adjustable row length sensor 152 are associated with the stop-space conveyer 140 and the row formation conveyor 142. In this exemplary embodiment, the row length sensor 152 and the stop-space sensor 150 are disposed adjacent to the conveyor 110, and are configured to monitor product units 118 on the conveyor 110. The stop-space sensor 150 may be located substantially in the area between the stop-space conveyor 140 and the row formation conveyor 142, and may be configured to determine when product units pass from the stop-space conveyor 140 to the row formation conveyor 142. The row length sensor 152 is disposed along the row formation conveyor 142 and may be moveable along the length of the conveyor, to adjust the distance between the two sensors 150 and 152. The distance between the two sensors 150 and 152 determines the length of a row of product to be indexed by the row formation conveyor 142 and then transported from the row formation conveyor 142 to the palletized load by the clamp 104.

Figure 5:
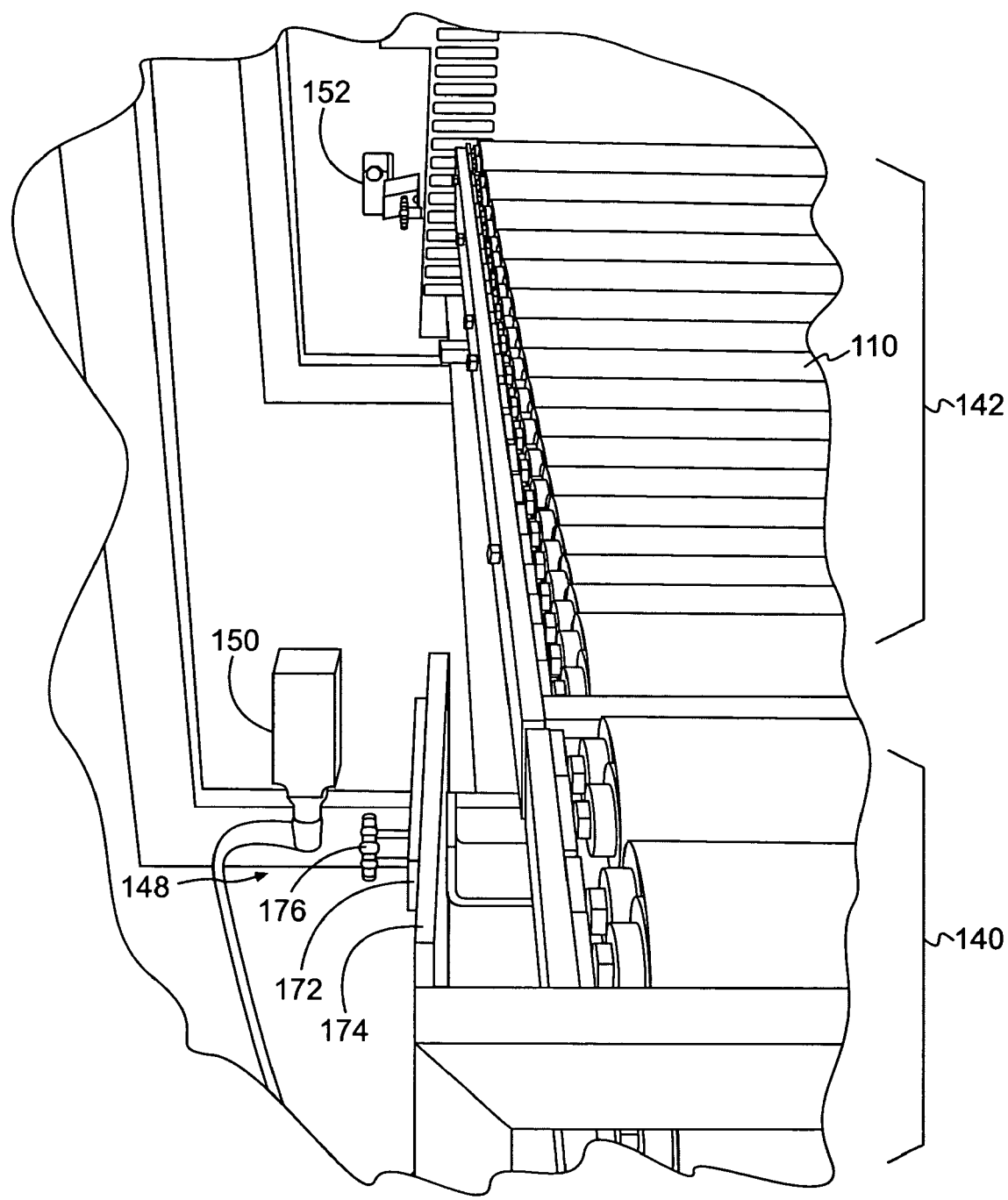
FIG. 5 is a pictorial representation of exemplary sensors along a conveyor according to one aspect of the present invention.

FIG. 5 shows one exemplary embodiment of the conveyor 110, with the stop space conveyor 140 and the row formation conveyor 142. In this embodiment, the stop space sensor 150 and the row length sensor 152 are each attached to an adjustable bracket assembly 148. Bracket assembly 148 may be secured at the side of the product conveyor 110, and may enable an operator to change the desired volume of the palletized load by adjusting the length of the product rows 116 that are to be placed on the pallet.

Figure 7:
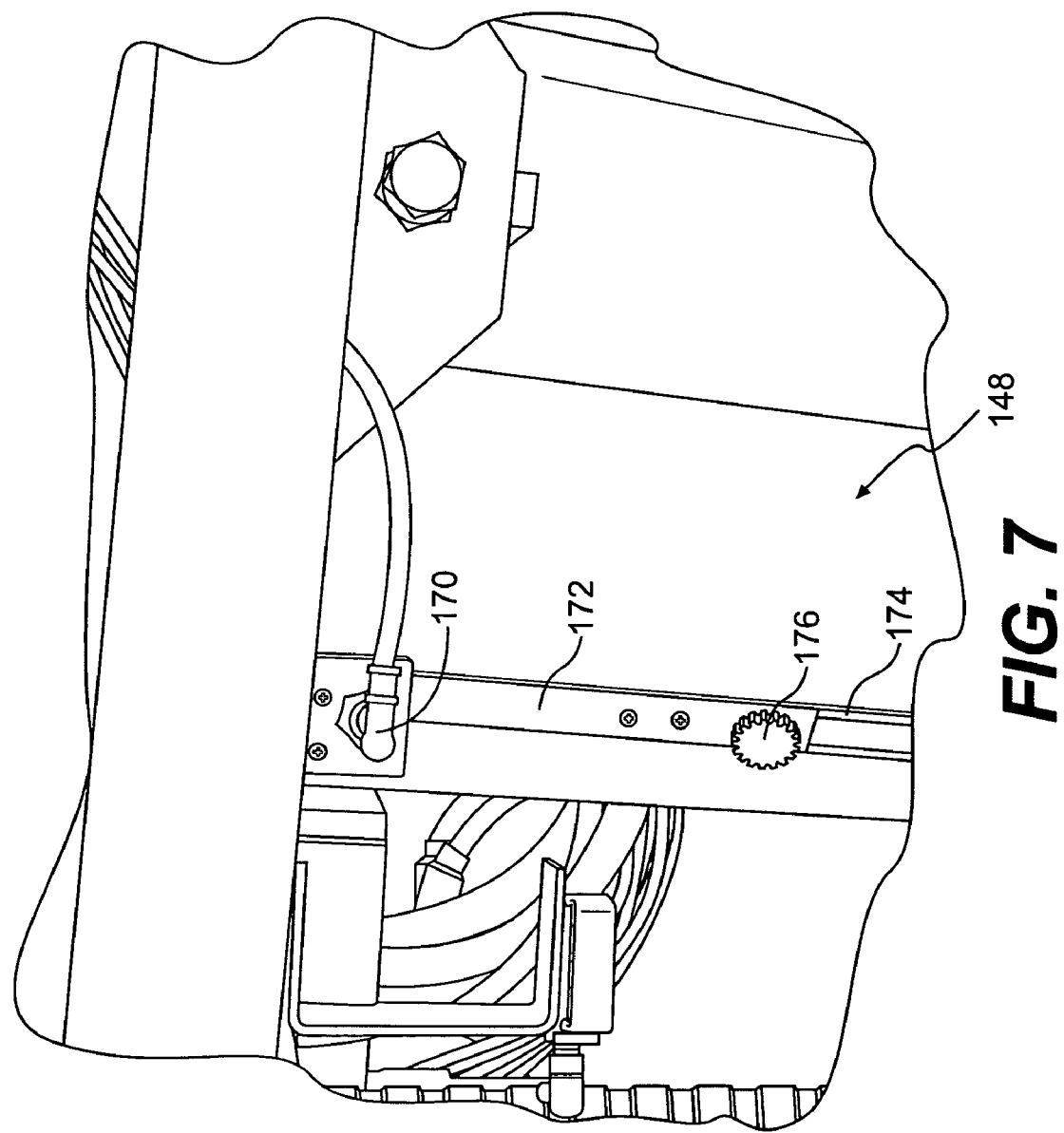
FIG. 7 is a pictorial representation of exemplary sensors on a product transporter according to one aspect of the present invention.

One example of an adjustable bracket assembly 148 is shown in FIG. 7. The adjustable bracket assembly 148 may include a bar 172 configured to slide within a track 174. A knob 176 having a bolt extending through a threaded hole in the bar 172 may be used to frictionally secure the bar 172 to the track 174 at a desired location. A ruled reference label (not shown) may be attached next to the track 174, and may be configured to show the length of the product row based on the position of the row length sensor 152. The ruled reference label could be, for example, in linear units, such as inches, or in product units.

Figure 6:
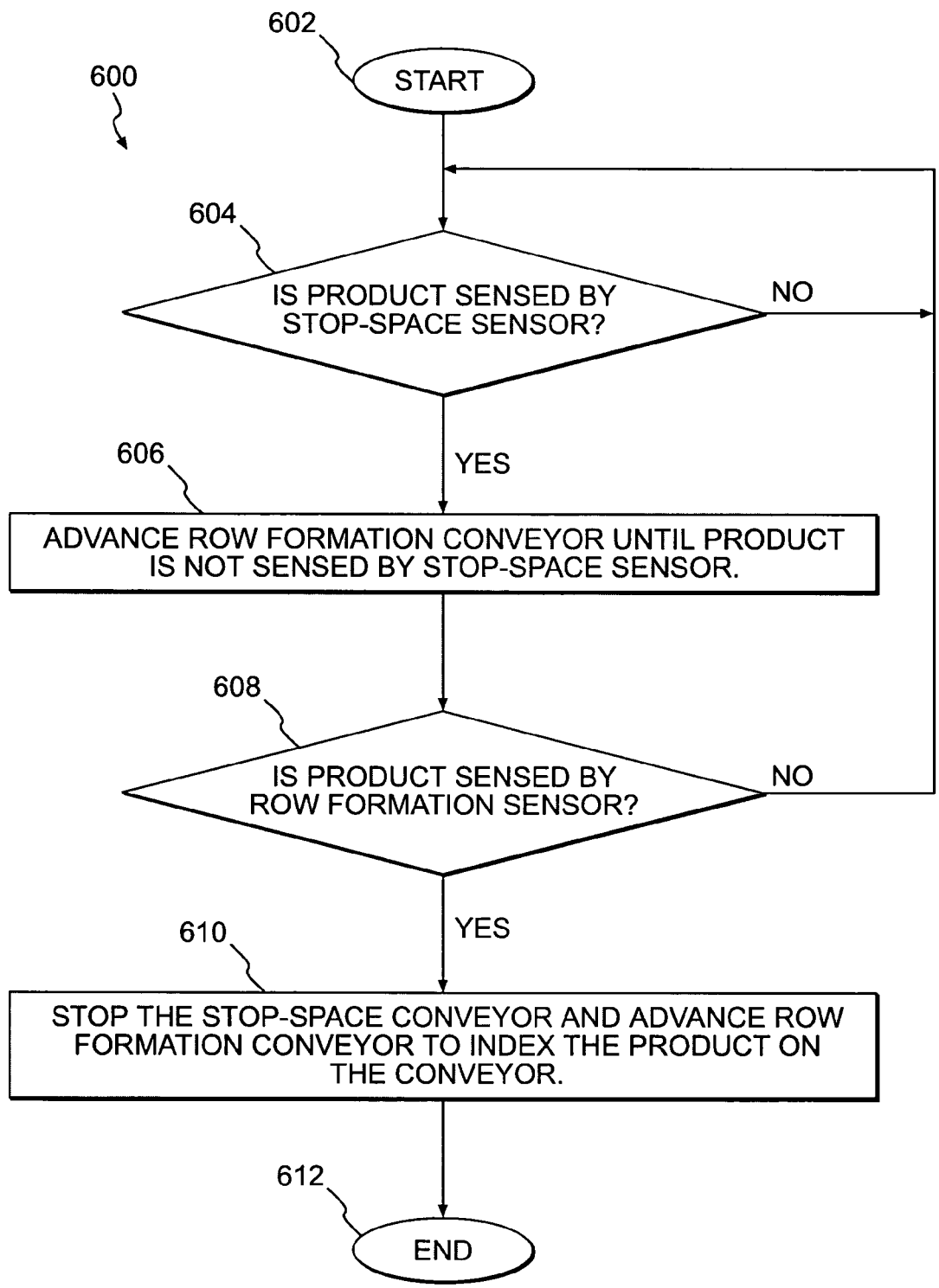
FIG. 6 is a flow chart for measuring a row of product according to one aspect of the present invention.

FIG. 6 is a flow chart 600 showing an exemplary method for indexing product on the row formation conveyor 142. The method may be stored as a data structure, a sequence of a data structure, and/or computer program in the memory component 138 of the controller 134, to be executed by the processor 136.

In this exemplary embodiment, the stop-space conveyor 140 continuously advances product to the palletizer from, for example, a manufacturing area. In contrast, the row formation conveyor 142 may advance when the stop-space sensor 150 senses a product unit passing from the stop-space conveyor 140 to the row formation conveyor 142, and may stop advancing when the product unit is not sensed. Accordingly, the row formation conveyor 142 may be used to bring together product units that may be spaced a distance apart on the stop-space conveyor 140, such as when they come from a manufacturing area.

With reference to FIG. 6, the method begins at a start step 602. This start step 602 may include powering the system or alternatively, may include simply sensing product on the conveyor. At step 604, the stop-space sensor 150 may monitor the conveyor 110 to sense product passing the sensor. In this exemplary method, if the sensor does not sense a product unit passing on the conveyor, then the system takes no action, and the stop-space conveyor 140 may continue to operate to convey product to the palletizer 100. However, when the stop-space sensor 150 senses a product unit passing it, then the row formation conveyor 142 is advanced until the product unit is no longer sensed by the stop-space sensor 150, at a step 606. In other words, in this exemplary method, the row formation conveyor 142 is advanced until the product unit has fully moved past the stop-space conveyor sensor 150, off of the stop-space conveyor 140, and fully onto the row formation conveyor 142. Once the stop-space conveyor sensor 150 no longer senses a product unit, the row formation conveyor 142 is stopped. Accordingly, the product unit is now located only just past the stop-space sensor 150.

Although the row formation conveyor 142 is stopped, the stop-space conveyor 140 continues to advance the next product unit toward the row formation conveyor 142, reducing or eliminating any distance between the first product unit, and a next product unit on the stop-space conveyor 140. When the next product unit is sensed by the stop-space conveyor sensor 150, any gap between the original product unit and the next product unit is substantially eliminated. Then, when the stop-space sensor 150 senses the next product unit, the formation conveyor 142 is again advanced only until the next product unit passes the stop-space sensor 150. So doing enables product units to be adjacent each other on the row formation conveyor 142, though they may be spaced apart on the stop-space conveyor 140.

At a step 608, the system may monitor whether enough product units have accumulated on the row-formation conveyor 142 to form a product row 116 by determining whether product is sensed by the row length sensor 152. The row length sensor 152 is used to sense when enough product units are on the row formation conveyor 142 to form a complete row of product. If product is not sensed by the row length sensor 152, then the system continues to monitor for product units passing the stop-space sensor 150. If the row length sensor 152 senses product at step 606, then the stop-space conveyor 140 is stopped and the row formation conveyor 142 is advanced to index the product on the conveyor, at step 610. Accordingly, when the row length sensor 152 senses product, the system determines that enough product units 118 to complete a full row for the palletized load is located on the row formation conveyor 142. As such, the row formation conveyor 142 advances the product row 116 to the conveyor end 111, so that the palletizer 100 can transport the product row 116 to the pallet 112.

Indexing of the product on the row formation conveyor 142, i.e., advancing the row of product to the end of the row formation conveyor 142 and to remove any space between the product units, may be accomplished using a timer system. In one embodiment, the row formation conveyor 142 is powered to advance the product units 118 on the row formation conveyor 142 to the conveyor end 111 for a set period of time. The period of time is established to be sufficient to fully index the row. Once the product row 116 is fully indexed, the product row 116 on the row formation conveyor 142 is ready to be picked up by the transporting system 102.

At a step 612, the process ends. The process may restart after the transporting system 102 removes the indexed row of product from the row-formation conveyor 142.

Palletizer Operation

Mast-Arm Sensors

Returning to FIGS. 3 and 4, the sensors that monitor movement of the arm 106 relative to the mast 108 will now be described. The sensors may include a mast upper limit sensor 160, a deceleration mast upper limit sensor 162, an arm home sensor 164, a deceleration arm home sensor 166, a mast lower limit sensor 168, and a max load height sensor 170. As shown in FIG. 3, the mast upper limit sensor 160 disposed on an upper portion of the mast 108, and indicates the maximum travel height of the arm 106 along the mast 108. The mast upper limit sensor 160 is configured to be activated when the arm 106 is raised along the mast 108 to the upper limit sensor 160, and to signal to the controller 134 to stop any further upward movement of the arm 106. The mast upper limit sensor 160 may be a proximity sensor, or another type of sensor, as would be apparent to one skilled in the art.

In this exemplary embodiment, the arm 106 moves substantially vertically along the mast 108 at two speeds. A first, faster speed is used when the arm 106 is moving within the central region of the mast 108, where the arm 106 will not need to suddenly be stopped. A second slower speed is used when the controller 134 recognizes that the arm 106 is about to stop. To determine that the arm 106 is about to stop, a deceleration upper limit sensor 162 is located on the mast 108 below the upper limit sensor 160. The deceleration upper limit sensor 162 may be located a distance, such as about 6 inches, below the upper limit sensor 160, and may be configured to indicate to the controller 134 that the speed of the arm 106 should be reduced because the arm 106 is approaching the maximum travel height of the mast 108.

In this embodiment, the arm 106 may move at the first, higher speed until the deceleration upper limit sensor 162 determines that the arm 106 is approaching the upper limit of the mast 108. At that time, the speed of the arm 106 may be reduced to the second, slower speed. Accordingly, when the arm 106 reaches the upper limit sensor 160, the arm 106 is moving more slowly and need not stop abruptly. The mast deceleration upper limit sensor 162 may also be a proximity sensor, or another type of sensor, as would be apparent to one skilled in the art.

The arm home sensor 164 may be placed along the mast 108 to indicate that the arm 106 is located at a height that corresponds to a height of the product conveyor 110. Accordingly, when the arm home sensor 164 is activated, the arm 106 is located along the mast 108 at a height that would enable the transporting system 102 to pick-up and transport a product row 116 from the product conveyor 110.

The deceleration arm home sensor 166 may be provided a short distance, such as, for example, 6 inches, from the arm home sensor 164 on the mast 108 to signal when the arm 106 is moving close to the home position. In the exemplary embodiment shown, it is located below the arm home sensor 164. When returning to the product conveyor 110 to pick up a new row of product, the arm 106 may quickly move downward at a first speed along the mast 108 until the deceleration arm home sensor 166 is activated. At that time, the speed of movement of the arm 106 may be reduced to a second, relatively slower speed, as described above. Accordingly, when the arm home sensor 164 is activated by the arm 106, the arm 106 is already moving slowly, and therefore, may more easily stop at the home position.

The mast lower limit sensor 168 is adjustably attached to the mast 108, and may be placed to indicate the lowest travel height of the arm 106 along the mast 108. The controller 134 may be configured to not allow any further downward movement of the arm 106 on the mast 108 once the mast lower limit sensor 168 is activated.

The max load height sensor 170 is slidably attached to the mast 108, and may be used to set the desired height of the palletized load. The max load height sensor 170 may be a vertically adjustable sensor, and may be adjusted either automatically or manually. The max load height sensor 170 may sense when the arm 106 is operating at the desired height of the palletized load while placing product on the palletized load. The controller 134 may be configured to receive a signal from the max load height sensor 170 and control the palletizer 100 to refrain from adding another product layer 126 to the palletized load 124 that would be above the desired load height.

As described above, FIG. 7 shows one exemplary embodiment of the adjustable bracket assembly 148. It is also shows the max load height sensor 170, that may be attached to the adjustable bracket assembly, and may be manually raised or lowered along the mast 108 using the adjustable bracket assembly 148. A ruled reference label (not shown) may be configured to show the height of the palletized load based on the position of the max load height sensor 170. The ruled reference label could be, for example, in measurement units, such as, for example inches, product units, or product layers.

The sensors described above could be any type of sensor capable of sensing when a component is near or is passing the sensor, including, for example, proximity sensors and photo sensors. In one embodiment, all of the sensors described above are proximity sensors such as IFM Effector switches. In another embodiment, the sensors are photo sensors that may be manufactured by SICK and may be W-250 series sensors. However, other sensors could be used as would be apparent to one skilled in the art.

Arm-Clamp Sensors

The sensors associated with the movement of the clamp 104 relative to the arm 106 will now be described. The sensors, as shown in FIGS. 3 and 4, may include a clamp home sensor 180, a deceleration clamp home sensor 182, an arm outer limit sensor 184, a deceleration arm outer limit sensor 186, and max load width sensor 188. The clamp home sensor 180 may be located on the arm 106 to indicate that the clamp 104 is located at a position that corresponds to the position of the product conveyor 110. Accordingly, when the clamp home sensor 180 is activated, the clamp 104 may be located in a position along the arm 106 to pick-up a product row 116 from the product conveyor 110. It may be located at the non-cantilevered end of the arm 106, thereby also indicating the travel limit of the arm 106.

When the clamp home sensor 180 and the arm home sensor 164 are both activated to indicate that the clamp 104 and arm 106 are both in the home position, the palletizer 100 may be configured to restrict any downward movement of the arm 106 along the mast 108, and in one embodiment, horizontal movement of the clamp 104 along the arm 106. In such a position, downward movement, and/or horizontal movement of the clamp 104 might potentially cause the clamp 104 to collide with the product conveyor 110. Accordingly, the controller 134 may be configured to require that the arm 106 be moved from the home position before allowing downward or horizontal movement of the clamp 104.

The deceleration clamp home sensor 182 may be positioned on the arm 106 a short distance, such as, for example, 6 inches, away from the clamp home sensor 180, toward the cantilevered end of arm 106. When returning to the product conveyor 110 to pick up a new product row 116, the clamp 104 may quickly move along the arm 106 at a first speed until the deceleration clamp home sensor 182 is activated. At that time, the speed of movement of the clamp 104 along the arm 106 may be reduced to a second, relatively slower speed, as described above with reference to the arm-mast sensors. Accordingly, when the clamp home sensor 180 is activated by the clamp 104, the clamp 104 is already moving slowly, and may more easily stop.

The arm outer limit sensor 184 and the deceleration arm outer limit sensor 186 are shown in FIG. 4, and in this embodiment, are disposed on the cantilevered end of arm 106 opposite the end attached to the mast 108. The arm outer limit sensor 184 indicates to the controller 134 that the clamp 104 has reached the outer limit of travel along the arm 106. Accordingly, the controller 134 may be configured to prevent further movement of the clamp 104 in that direction. The deceleration arm outer limit sensor 186 may be located a distance, such as about 6 inches, from the arm outer limit sensor 184, and may signal the controller 134 to slow the speed of travel of the clamp 104 along the arm 106 from a first speed to a second, relatively slower speed because it is approaching the limit of travel as explained above.

In one embodiment, the arm outer limit sensor 184 is aligned with an outer edge of the pallet load 124. As such, when placing a row of product on a pallet, the clamp 104 may move to the end of the arm 106 to activate the outer limit sensor 184. At that time, the controller 134 may determine that the product row is in a position to be deposited on the palletized load.

The max load width sensor 188, shown in FIG. 3, may indicate that the clamp 104 is at the desired maximum load width position of the load. This sensor may be located on the arm 106 and may be horizontally adjusted along the arm 106 to set the desired width of the palletized load at a desired width. Alternatively, the sensor may be located on the clamp 104, and may be operable to determine when the clamp 104 has moved to a given point along the arm 106. The distance between the arm outer limit sensor 184 and the max load width sensor 188 may determine the width of the palletized load.

In one exemplary embodiment, the max load width sensor 188 could be a proximity sensor or a photo cell sensor disposed on the clamp 104. When the max load width sensor 188 is a photo cell sensor, a reflector device for activating the photo cell sensor may be attached to the arm 106, while the sensor is attached to the clamp 104. Accordingly, the sensor 188 may move horizontally along the arm with the clamp 104, while the reflector device is located at a set position on the arm.

In this exemplary embodiment, the reflector device of the max load width sensor 188 may be adjusted along the arm 106 using a bar and track system as described above with reference to the max load height sensor 170, including a bar, a track, and a knob. Other systems for adjustably locating the reflector device could also be used. In one exemplary embodiment, the sensor 188 is disposed on the arm 106 and the reflector device is located on the clamp 104. A ruled reference label may be attached next to the track to show the width of the palletized load based on the position of the max load width sensor 188.

The max load width sensor 188 also may be used to determine when the clamp 104 is horizontally clear of the conveyor 110. As such, the arm 106 may be restricted from moving further downward until the clamp 104 is horizontally beyond the max load width sensor 188. At that time, the arm 106 may be allowed to travel downward to place the product row on the palletized load. This ensures that the arm 106 will not travel too far down the mast 108 while the clamp 104 is above the product conveyor 110, bringing the clamp 104 into undesired contact with the product conveyor 110.

In one exemplary embodiment, the max load width sensor 188 may also be used to determine when a product layer of the palletized load is complete. In this embodiment, the controller 134 may determine that the product layer is complete when certain conditions are met. In this exemplary embodiment, the conditions may be met when the product is placed by the clamp 104, while the max load width sensor 188 is open or activated. Other conditions could be used, as would be apparent to one skilled in the art. In this example, the reflector device associated with the max load width sensor 188 may be of a given length, such as for example, 3 to 8 inches long. Accordingly, as the clamp 104 moves across the load, the max load width sensor 188 may be activated or open during the first 3 to 8 inches of movement. This is because the max load width sensor 188 detects the reflector so long as the clamp 104 moves along the arm 106 less than the length of the reflector. If the controller 134 determines that the product should be placed on the load before the max load width sensor 188 passes beyond the reflector device, then the controller 134 may be configured to determine that the product was placed at the edge of the load. Thus, the controller may also be configured to determine that the product layer is complete.

In one exemplary embodiment, the max load width sensor 188 and the max load height sensor 170 may be used together to determine when the palletized load is complete based on a defined volume being filled by product. The max load width sensor 188 may be used to identify the last row of a product layer, and the max load height sensor 170 may be used to indicate the last product layer of a load. When both the max load width sensor and the max load height are activated during placement of a row, the controller may be configured to determine that the palletized load is complete.

It should be noted that although the max load width sensor 188 may be used to determine when a product layer is complete, in one exemplary embodiment, the sequence followed by the controller 134 to transport product of the load does not change until the desired palletized load volume is filled. Thus, in one example, the controller 134 is not configured to acknowledge when a product layer is complete, but is only configured to acknowledge when the load is complete, based on combined signals from both the max load width sensor 188 and the max load height sensor 170. This may be accomplished, for example, by configuring the controller to only monitor for simultaneous activation of the max load width sensor 188 and the max load height sensor 170. Thus, activating only the max load width sensor 188 would not be a condition acknowledged by the controller 134. As explained in one exemplary embodiment, below, the controller may be configured to place product on the load without requiring that the controller 134 acknowledge that a product layer is complete.

In one embodiment, the clamp home sensor 180, deceleration clamp home sensor 182, arm outer limit sensor 184, and deceleration arm outer limit sensor 186 are all proximity sensors. The max load width sensor 188 may be a photo sensor. However, other sensors may be used as would be apparent to one skilled in the art.

Clamp-Grip Sensors

The sensors for measuring the position of the moveable grip 120, relative to the product holder, such as the fixed grip 122 of the clamp 104 will now be described. The sensors may include a clamp inner limit sensor 220 and a clamp outer limit sensor 222. The clamp inner limit sensor 220 and the clamp outer limit sensor 222 may be set along the clamp 104 at the ends of the mechanical travel length of the moveable grip 120. The clamp inner limit sensor 220 may be located adjacent to the fixed grip 122, and may be configured to indicate that the moveable grip 120 may not move closer to the fixed grip 122.

The clamp outer limit sensor 222 may be located at the end of the travel length of the moveable grip 120, and may be configured to indicate that the moveable grip 120 can move no further from the fixed grip 122. The controller 134 may be configured to stop the movement of the moveable grip 120 when either of these sensors are activated.

In one embodiment, the clamp inner limit sensor 220 and the clamp out limit sensor 222 are both proximity sensors. However, other sensors, including photo sensors could be used, as would be apparent to one skilled in the art. In other exemplary embodiments, where the product holder is not a clamp, the sensors may be configured to sense the location of any product being moved by the product holder relative to a pallet or previously placed product.

Product-Arm Sensors

The sensors for measuring the position of the arm 106, relative to the product, including the palletized load and the product on the product conveyor 110, will now be described. The sensors include a height of product in-feed sensor 200 and a height of pallet load sensor 202. The height of product in-feed sensor 200 may be used to determine whether the clamp 104 is high enough to clear the product in-feed on the conveyor 110, when the clamp 104 is returning along the arm 106 to the home position. If the clamp 104 will not clear the product on the conveyor 110 as sensed by the height of in-feed sensor 200, the controller 134 may raise the arm 106 along the mast 108 until the arm 106 is high enough that the clamp 104 clears the product on the conveyor.

To do this, in this embodiment, the height of product in-feed sensor 200 is attached to the arm 106 and thereby is configured to move vertically with the arm 106. The height of product in-feed sensor 200 may be placed on the arm 106 in a position lower than the bottom of the clamp 104, and may be configured to sense whether product is located in front of the sensor. A bracket system may extend from the bottom of the arm 106 for securing the height of product in-feed sensor 200 in its position. In one alternate embodiment, the height of product in-feed sensor 200 is located directly on the clamp 104. When the height of product in-feed sensor 200 does not sense product, then the system determines that the arm 106 is high enough that the clamp 104 may travel above any product units 118 on the conveyor 110.

In one exemplary embodiment, the height of product in-feed sensor 200 may be a photo sensor on the arm 106 or clamp 104. A reflector, associated with the height of product infeed sensor 200, may be placed in a position such that any product units 118 on the row formation conveyor 142 is between the reflector and the sensor. In one embodiment, the reflector is placed adjacent to the conveyor 110, across from the stop-space sensor 150, while the sensor 200 is placed on the arm 106 at the opposite side of the conveyor 110. The reflector may extend vertically upward, so that the sensor 200 detects when the arm 106 and clamp 104 are above the product units 118.

Similarly, the height of pallet load sensor 202 determines whether the arm 106 is at a height sufficient to avoid interference between the moving clamp 104 and the palletized load. The height of pallet load sensor 202 may be oriented at the cantilevered end of the arm 106 to diagonally sense across the palletized load to a reflector. The reflector may be positioned such that a portion of any row placed on the palletized load would be between the height of palletized load sensor and the reflector. As the arm 106 vertically moves, the height of pallet load sensor 202 may be configured to perceive whether an obstruction is between the reflector and the sensor, thereby indicating whether the arm 106 is high enough for the clamp 104 to travel along the arm 106 without colliding with the pallet load 124. For example, in one embodiment, after the clamp 104 places a product row 116 on the pallet load 124, the arm 106 is moved vertically upward along the mast 108 until the height of pallet load sensor 202 senses that the arm 106 is high enough that the clamp 104 may pass over the newly placed product row 116.

In one embodiment, the height of product in-feed sensor 200 and the height of pallet load sensor 202 are both photo sensors. However, other sensors could be used as would be apparent to one skilled in the art.

Product-Clamp Sensors

The sensors for measuring and monitoring the position of the clamp 104 relative to the product on the palletized load, or the pallet itself, will now be described. The sensors may be referred to as product sensors, and may include a row sensor 210, a deceleration row sensor 212, and a layer sensor 214. These sensors each may be attached to the clamp 104, and may be positioned to detect the position of previously product on a load as the clamp 104. Accordingly, these sensors may be positioned adjacent to the fixed grip 122. The layer sensor 214 may be positioned in a location lower than any product carried by the clamp 104, thereby being in a position to detect the location of previously placed product or the pallet.

The row sensor 210 is used to indicate when the clamp 104 is moved adjacent to a previously placed row. This information enables the controller 134 to move the clamp 104 to a proper position to place the subsequent row of product. As shown in FIG. 3, the row sensor 210 is located at a side of the fixed grip 122, and, in one embodiment, is offset about one-half inch from the fixed grip 122. In this embodiment, because the row sensor 210 is offset from the fixed grip 122 by one-half inch, a timer may be used to move the clamp 104 the one-half inch after the row sensor 210 senses a previously placed row of product, thereby closing any gap between the previously placed row of product and the clamp 104. Other systems for ensuring a minimum gap between rows may be used as would be apparent to one skilled in the art.

As shown in FIG. 3, the deceleration row sensor 212 may be horizontally spaced away from the row sensor 210 by a distance, such as about 6 inches, and may be configured to indicate to the controller 134 that the clamp 104 is approaching a previously placed row and that the speed of movement of the clamp 104 along the arm 106 should be reduced. This reduction from a first speed to a second, relatively slower speed, may operate in the manner discussed above. The deceleration row sensor 212 may also be a photo sensor.

The deceleration row sensor 212 and the row sensor 210 may be located in other positions about the palletizer 100, so long as they can directly or indirectly sense the position of the load relative to product being placed on the load.

A layer sensor 214 may also be associated with the clamp 104. It may be used to determine whether the product row carried by the clamp 104 is above either the pallet 112 or a product layer previously placed on the pallet. As such, the layer sensor 214 may be positioned on the clamp 104, slightly lower than a bottom of a product row carried by the clamp 104, and may sense any obstruction below the product carried by the clamp 104. In one embodiment, the layer sensor 214 is secured to a bracket system extending downward from the a portion of clamp 104.

Because the row sensor 210 senses previously placed product next to the clamp 104, and the layer sensor 214 senses a previously placed product layer or a pallet below the clamp 104, the two sensors operate together to determine where the clamp 104 should place the next row of product. The controller 134 signals the clamp 104 to deposit a new product row next to a previous row or pallet edge and on top of a product layer or pallet sensed by the two sensors.

Figure 8:
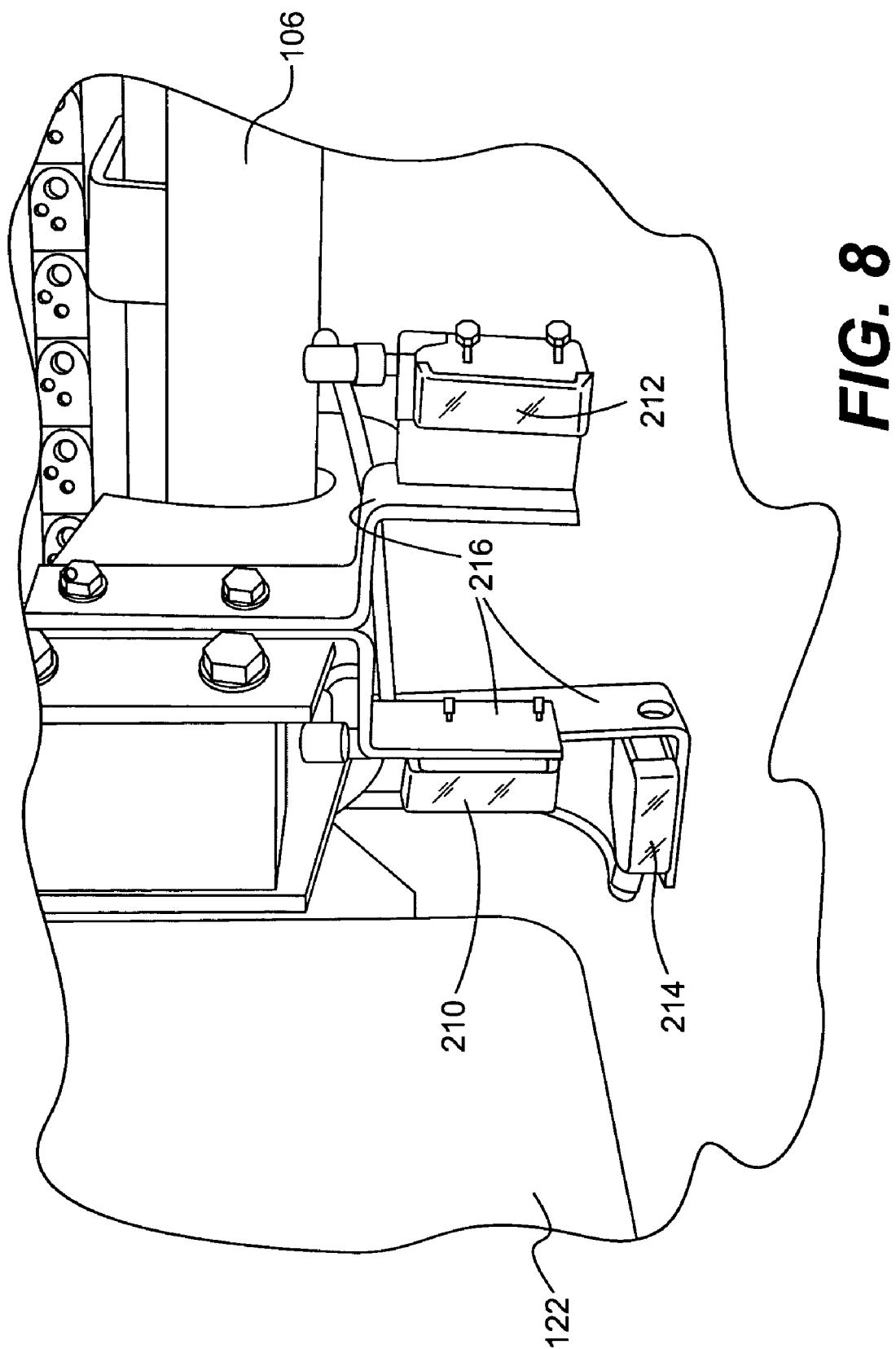
FIG. 8 is a pictorial representation of an exemplary bracket system for adjusting the location of a sensor according to one aspect of the present invention.

FIG. 8 shows one possible configuration of the row sensor 210, the deceleration row sensor 212, and the layer sensor 214. As shown, the row sensor 210 is substantially aligned with the fixed grip 122. It may be offset a short distance from the fixed grip 122, such as by about ½ inch. The deceleration row sensor 212 may be offset a certain distance, such as about 6 inches, from the row sensor 210. The layer sensor 214 may be positioned at an elevation lower than product carried by the clamp 104. Each of the row sensor 210, the deceleration row sensor 212, and the layer sensor 214 may be attached to the clamp 104 with brackets 216 configured to secure the sensors in the desired position.

In one embodiment, the row sensor 210, the deceleration row sensor 212, and the layer sensor 214 are all adjustable range photo sensors manufactured by SICK and may be W-250 series sensors. However, other sensors may be used as would be apparent to one skilled in the art.

Palletizer Method

Figure 9A:
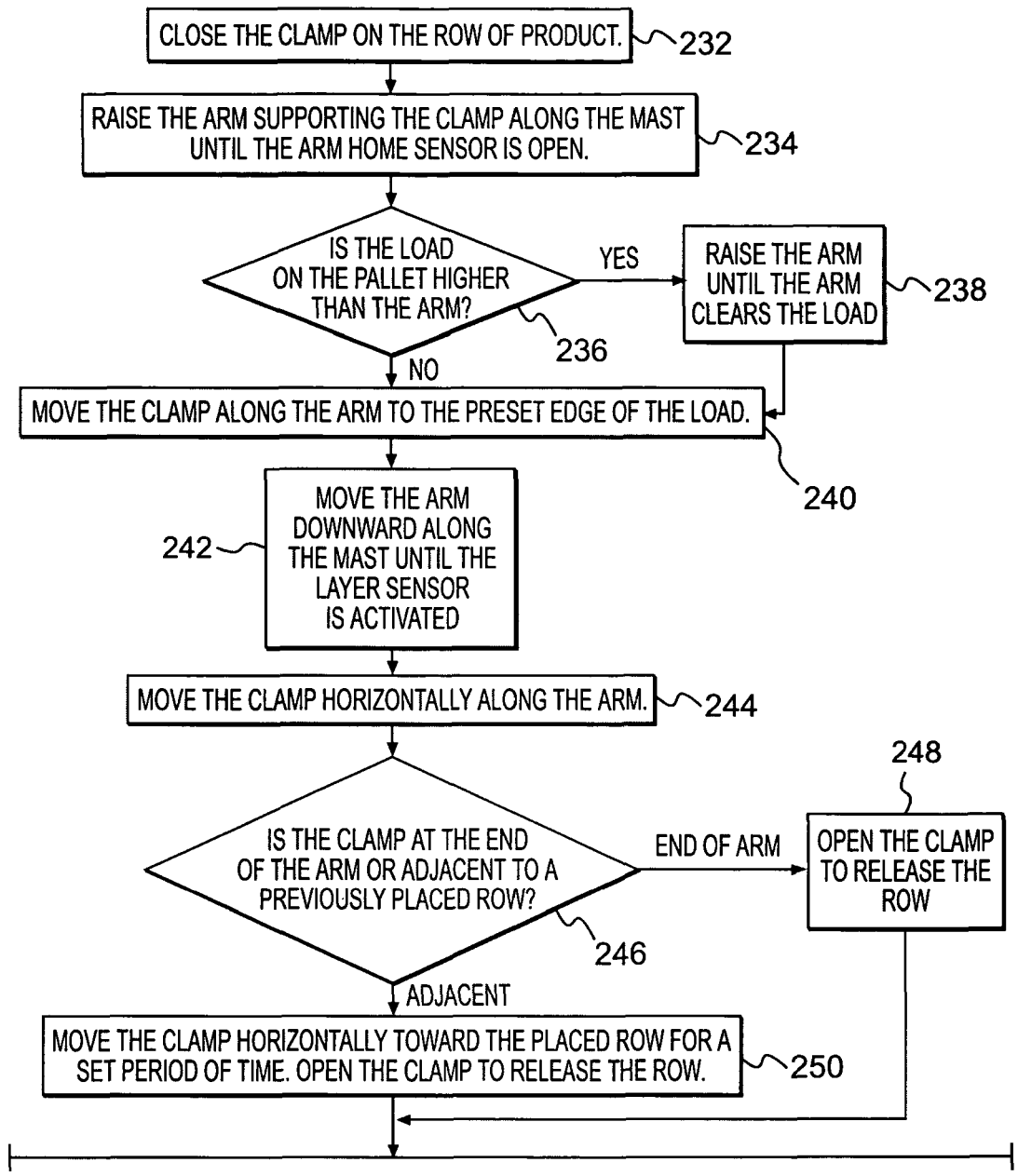
FIGS. 9A and 9B are a flow charts for loading a pallet with product according to one aspect of the present invention.
Figure 9B:
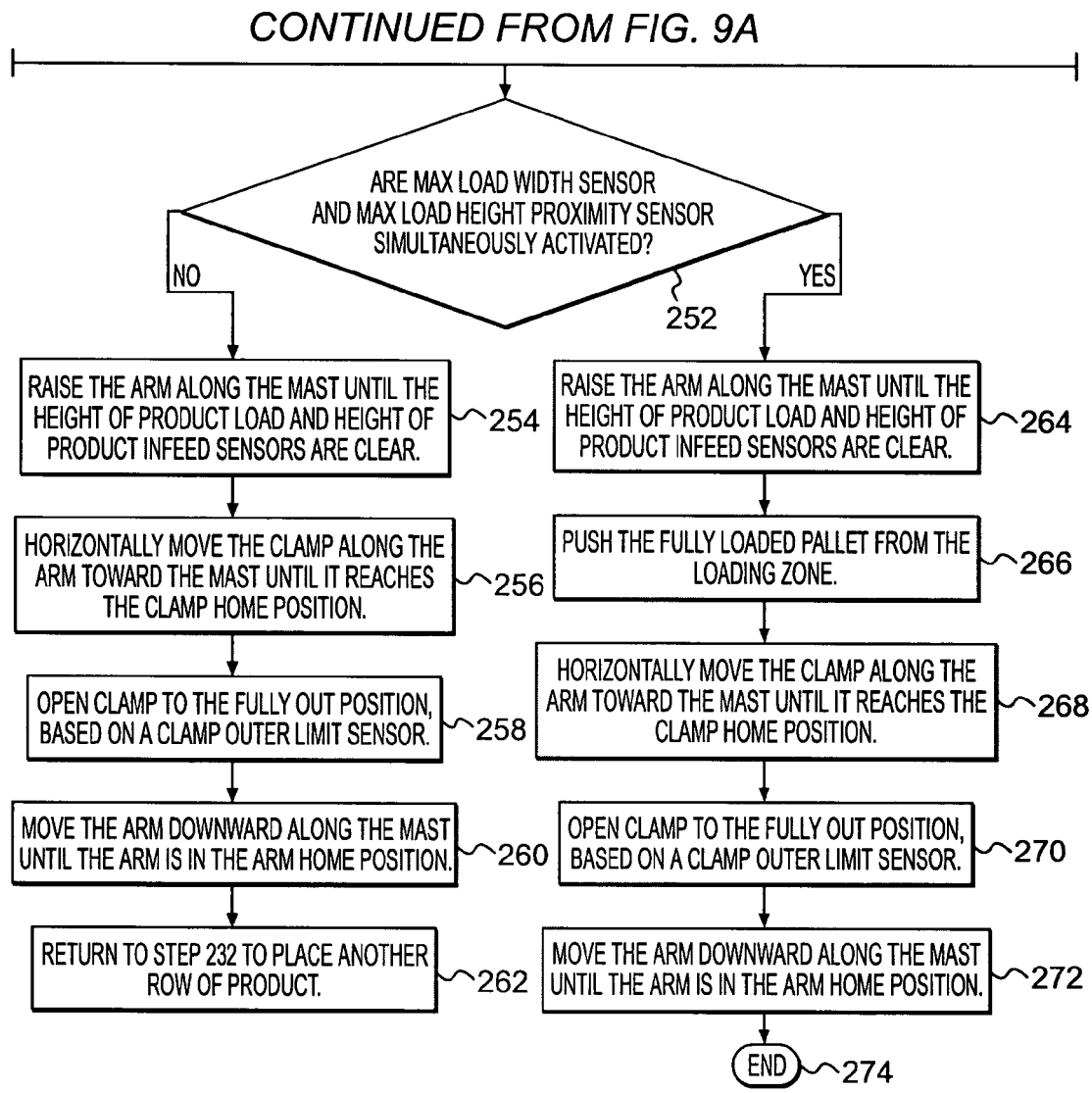

FIGS. 9A and 9B are flow charts describing an exemplary method of using the palletizer 100 to load a pallet 112 with product units 118 to fill a pre-defined volume. The flow charts describe a transporting cycle that may be repetitively followed until the palletized load is complete. A transporting cycle may be the movement of the transporting device 102 from the home position to place product and back to the home position. The transporting cycle may be stored as a computer program including data sequences in the memory component 138 of the controller 134, to be executed by the processor 136. As described above, the palletizer 100 loads the pallet 112 with product units 118 to fill a volume defined by the row length sensor 152, the max load width sensor 188, and the max load height sensor 170. The processor may receive signals from any of the sensors and, based on the signals, execute the program to load the pallet. Because the palletizer fills a pre-defined volume, it is not required to count or track the position of placed product. Nor is it required to be reprogrammed or adjusted when the size of product units changes. Hence, each transporting cycle may follow the same logic sequence.

It should be noted that the flow chart begins after a product row 116 has been indexed, as describe above with reference to FIG. 6. At a step 232, the clamp 104 closes on a product row 116. As previously stated, the clamp 104 need not be a clamp, but could be any product holder, as would be apparent to one skilled in the art. After the clamp 104 is closed on the product row 116, the arm 106 rises along the mast 108 until the arm 106 is above the home position, as indicated by the arm home sensor 164, at a step 234. Once the arm home sensor 164 determines that the arm 106 is no longer in the arm home position, the arm is in a position above the conveyor 110 such that the clamp 104 may move horizontally without risk of colliding the clamp 104, along with any product carried by it, into the conveyor 110.

At a step 236, the controller 134 determines whether the palletized load 124 is higher than the arm 106, based upon signals from the height of pallet load sensor 202 as described above. If the controller 134 determines that the pallet load 124 is higher than the arm 106, the arm 106 is raised until the height of pallet load sensor 202 indicates that the arm 106 has cleared the load, at step 238.

If the controller 134 determines that the palletized load 124 is not higher than the arm, then the clamp 104 may be moved horizontally along the arm 106 to the adjustable preset outer edge of the palletized load as determined by the max load width sensor 188, at a step 240. In the embodiment described above, using a reflector, the processor 136 is configured so that when the max load width sensor 188 detects the reflector moveably fixed to the arm 106, the clamp 104 stops its horizontal movement.

At a step 242, the arm 106 moves downward along the mast 108 until the layer sensor 214 is activated, thereby detecting that the clamp 104 is above either a previously placed product layer 126 or the pallet 112. At a step 244, the clamp 104 moves horizontally along the arm 106. At a step 246, the controller 134 determines whether the clamp 104 is either at the end of the arm 106 using the arm outer limit sensor 184 or adjacent to a previously placed row using row sensor 210. If the arm outer limit sensor 184 signals that the clamp 104 is at the end of the arm 106, then the clamp 104 is opened to release the product row 116 onto the pallet load 124. As stated above, in this embodiment, the arm outer limit sensor 184 is set to correspond to the outer edge of the pallet load 124. Other configurations would be apparent to one skilled in the art.

In one embodiment, the clamp 104 is horizontally moved at a first speed until either the deceleration arm outer limit sensor 186 or the deceleration row sensor 212 indicate that the clamp 104 is approaching the outer limit of the arm 106 or another row of previously placed product. When the deceleration arm outer limit sensor 186 or the deceleration row sensor 212 is activated, then the clamp speed is reduced to a second relatively slower speed.

If at step 246, the clamp 104 is adjacent to a previously placed row, as sensed by the row sensor 210, then the clamp 104 is horizontally moved toward the previously placed row for a set period of time, for example, a period of time between 0.1 and 2.0 seconds, at a step 250. The period of time is chosen to allow the clamp to move only the distance between the fixed grip 122 and the previously placed product row 116, which in one example, could be one-half inch. The set period of time is dependent upon the speed of movement and the distance of the row sensor 210 from the fixed grip 122. The clamp 104 is then opened to release the row of product, at step 250.

At a step 252, the controller 134 determines whether the max load width sensor 188 and the max load height sensor 170 are simultaneously activated. If they are not simultaneously activated, then the arm 106 is raised along the mast 108 until the height of pallet load sensor 202 and the height of product infeed sensor 200 both determine that the arm 106 is high enough that the clamp 104 clears all product at a step 254. Then, the clamp 104 may horizontally move without undesired contact with the row just placed or with product accumulating on the product conveyor 110.

At a step 256, the clamp 104 is horizontally moved along the arm 106 toward the mast 108 until it reaches the clamp home position, as determined by the home clamp sensor 180. Simultaneously, at step 258, the moveable grip 120 is opened to the fully out position as determined by the clamp outer limit sensor 222.

In one embodiment, the clamp 104 may be moved at a first speed until the deceleration clamp home sensor 182 is activated. At that time, the speed of the clamp 104 may be reduced to a second relatively slower speed prior to being stopped in the clamp home position.

At a step 260, the arm 106 moves downward along the mast 108 until the arm 106 is in the arm home position as determined by the arm home sensor 164. In one embodiment, the arm 106 may be moved at a first speed until the deceleration arm home sensor 166 is activated. At that time, the speed of the arm 106 may be reduced to a second relatively slower speed, prior to being stopped in the arm home position. At a step 262, the controller logic returns to step 232 to pick up and convey the next product row 116 for delivery to the pallet.

After the transporting system 102 moves a product row 116 from the conveyor 110, the conveyor 110 operates as described above with reference to FIG. 6 to prepare the next row of product for delivery by the palletizer 100. By the time the arm 106 and clamp 104 reach the home positions as determined by the respective sensors, the next product row 116 may be ready to be picked up by the transporting system 102.

If at step 252, the max load width sensor 188 and the max load height sensor 170 are simultaneously activated, then the controller 134 determines that the palletized load is complete, i.e., that the pre-defined volume was filled when the last product row 116 of the last product layer 126 was placed. The controller 134 then may raise the arm 106 along the mast 108 until the height of product in-feed sensor 200 and the height of pallet load sensor 202 indicate that the arm is above the complete pallet load at a step 264.

At a step 266, the fully loaded pallet is pushed from the loading zone. Alternatively, the fully loaded pallet may be wrapped using a packaging material dispenser 127, as discussed with reference to FIG. 1.

At a step 268, the clamp 104 horizontally moves along the arm 106 until it reaches the clamp home position based upon the clamp home sensor 180. The clamp 104 is then opened to the fully out position as determined by clamp outer limit sensor 222, at a step 270. The arm moves downward along the mast until it is in the arm home position as determined by the arm home sensor 164, at a step 272. The method ends at a step 274. In one embodiment, the controller sends a signal to the pallet dispenser 128, which then dispenses a new pallet. The palletizer may then begin loading the new pallet with the first row on the first product layer.

Figure 10:
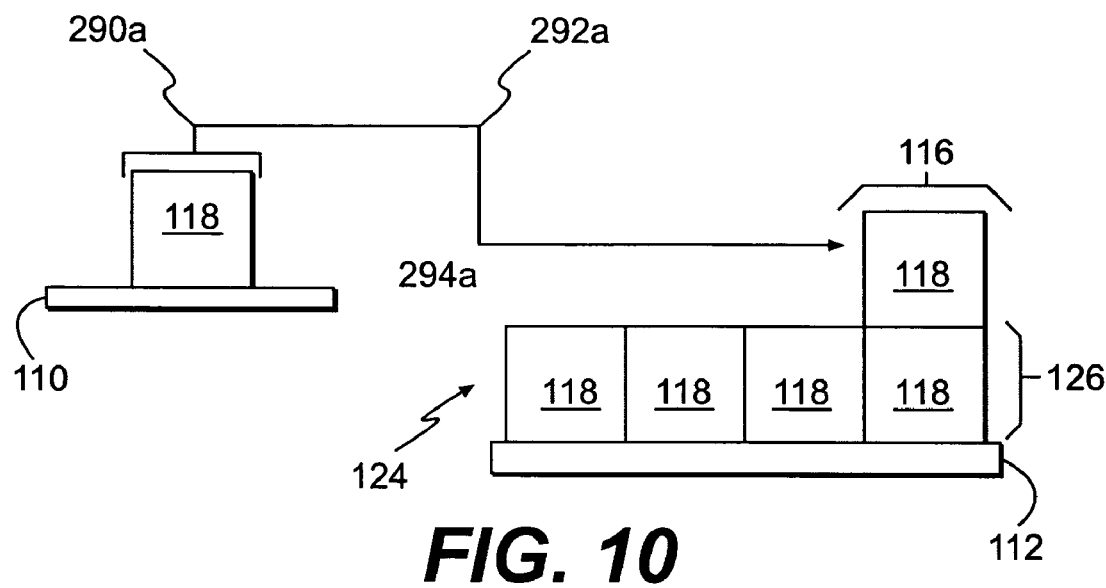
FIGS. 10 and 11 are sketches showing an exemplary travel path of a product transporter.
Figure 11:
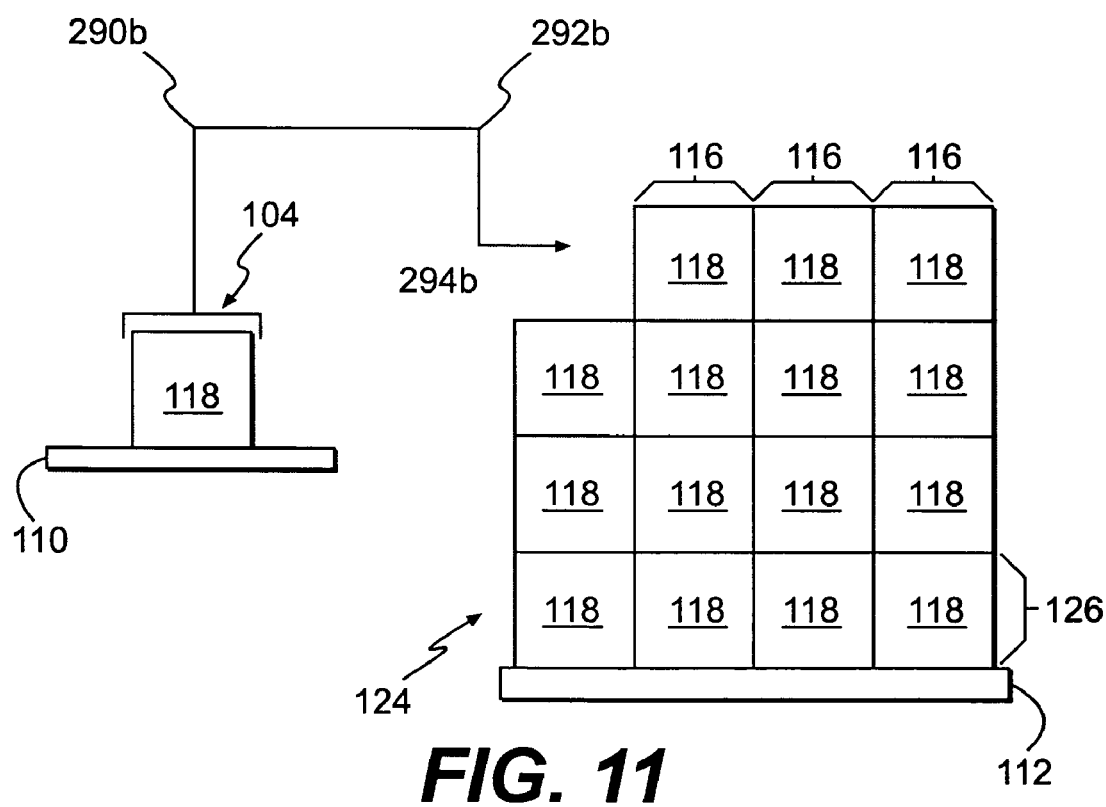

FIGS. 10 and 11 show exemplary travel paths of a product row held by clamp 104 using the system of the present invention. FIG. 10 shows a palletized load 124 having only a single product layer 126 on a pallet 112. Therefore, the height of the palletized load is lower than the product conveyor 110. In contrast, FIG. 11 shows a palletized load 124 having several product layers 126 on a pallet 112. Thus, the height of the pallet load 124 is higher than conveyor 110. As shown, in each instance, the travel path of the product row 116 begins on the conveyor 110 and is vertically raised until the height of pallet load sensor 202 indicates that the clamp 104 and the carried product row 116 are above the height of the palletized load 124 or that the arm 106 has left the arm home sensor 164, whichever is higher, as shown at points 290a and 290b on FIGS. 10 and 11, respectively. From that point, the product is horizontally moved until the max load width sensor 188 indicates to the system that the product has reached the edge of the load width, as shown at points 292a and 292b. At that point, the product row 116 is vertically lowered until the layer sensor 214 determines that the product is proximately above a previous product layer 126, or alternatively, an empty pallet 112, as shown at points 294a and 294b. Then, the controller 134 moves the product row 116 horizontally across the palletized load 124 until either the arm outer limit sensor 184 is activated or the row sensor 210 is activated. At that point, the system determines where to place the next row.

As shown in FIG. 11, the final row of each product layer 126 may include a horizontal travel path after being lowered to the load. It should be noted that when placing the final row of a single product layer, as shown in FIG. 11, that the system determines that the palletized load is complete when the max load width sensor 188 and the max load height sensor 170 are simultaneously activated. During the vertical lowering of the product row 116, the max load width sensor 188 is continuously being activated because the arm 106 is moving down while the clamp 104 is not moving at all relative to the arm 106. In order to ensure that the max load width sensor 188 is activated at the last row, a reflector associated with the max load width sensor 188 may have a reflector length of, for example, between about three and about eight inches. Thus, so long as the clamp 104 moves horizontally along the arm for less than the length of the reflector, the max load width sensor 188 will be activated.

In one exemplary embodiment, the method follows a sequence for loading a pallet based on an area defined by two of the following three sensors: the row length sensor; the max load height sensor 170; and the max load width sensor 188. Although any combination of the three sensors could be used to define the area to be filled, a preferred embodiment defines the area using the max load height sensor 170 and the max load width sensor 188. Thus, one example of this embodiment was described with reference to FIGS. 9A and 9B, where the placement of product occurred using the max height sensor 170 and the max load width sensor 180. It should be understood that length and width may be used interchangeably to describe a side of the load.

The palletizer 100 operates to fill the area defined by the max load height sensor 170 and the max load width sensor 188, using the row sensor 210 and the layer sensor 214, to fill the pallet load 124 until the area is filled. The palletizer 100 follows the same sequence, regardless of the size of the product, and continues to build the palletized load until the area is filled. Accordingly, the palletizer does not need to be reprogrammed for each size of product used to build the palletized load.

In yet another embodiment, the palletizer 100 is a three-axis palletizer that fills a load volume or a load area by placing one or more product units at a time on the load, thereby building a row on the pallet load. Building one or more rows on the pallet load may create a layer. In this exemplary embodiment, the palletizer may be configured to determine the location of an individual product unit being placed, relative to the location of the pallet or any previously placed product. The palletizer may then place the product unit on the load to create a row, a layer, and/or fill the volume of the load. In another embodiment, the palletizer 100 places complete layers on the pallet load at a time until the volume is filled.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of building a load with product from an infeed area of a palletizer, the method comprising:
    defining a desired area of a load to be filled with product using at least two of a height sensor, a length sensor, and a width sensor;
    automatically filling the desired area with product; and
    determining when the desired area is filled using at least two of the height sensor, the length sensor, and the width sensor.

2. The method of claim 1, wherein defining the desired area includes positioning at least one of the length sensor, the width sensor, and the height sensor to define the respective length, width, or height of the desired area.

3. The method of claim 1, wherein filling the desired area includes sensing the location of previously placed product on the load.

4. The method of claim 3, wherein filling the desired area further includes depositing the product upon the sensed location of the product previously placed on the load.

5. The method of claim 1, wherein filling the desired area includes sensing the location of the pallet.

6. The method of claim 1, wherein filling the desired area includes sensing a desired location of the product and placing the product to fill the desired area.

7. The method of claim 1, wherein defining the desired area includes setting a desired height of the load by positioning the height sensor.

8. The method of claim 1, wherein defining the desired area includes setting a desired length of the load by positioning the length sensor.

9. The method of claim 8, wherein positioning the length sensor includes adjusting the position of the length sensor to define the length of a product row on a conveyer.

10. The method of claim 1, wherein filling the desired area with product includes executing the same logic sequence in a controller for at least two consecutive transporting cycles.

11. The method of claim 1, wherein determining when the desired area is filled includes monitoring the at least two of the height sensor, the length sensor, and the width sensor for a signal indicating that at least two of a desired height, length, and width of the load is reached.

12. The method of claim 11, wherein determining when the desired area is filled further includes receiving a signal from the at least two monitored sensors at a controller.

13. The method of claim 12, wherein the controller is comprised of more than one processor.

14. The method of claim 1, further including pushing a completed load from a loading zone of the palletizer in which the desired area is defined.

15. The method of claim 1, wherein automatically filling the desired area includes one of placing a product unit on the load to build a row, placing a product row on the load to build a layer, and placing a product layer on the load to build the load.

16. A method of building a load with product from an infeed area, the method comprising:
    automatically moving a product from the infeed area to a load building area;
    automatically depositing the product on the load;
    automatically repeating the moving and depositing steps by repeating a single logic sequence for at least two consecutive moving and depositing steps; and
    automatically determining when the load is completely built using at least two of a height sensor, a length sensor, and a width sensor.

17. The method of claim 16, wherein the automatically moving and automatically depositing steps define a transport cycle, and wherein a controller executes the single logic sequence for each transport cycle of the load.

18. The method of claim 16, wherein the logic sequence is defined in computer executable code configured to be executed by a processor.

19. The method of claim 16, wherein automatically repeating the automatically moving and automatically depositing steps includes loading a first product having a first size onto a load and loading a second product having a second size onto the same load.

20. The method of claim 16, wherein repeating the single logic sequence for at least two consecutive moving and depositing steps includes:
    moving and depositing a first product having a first size in first moving and depositing steps; and
    moving and depositing a second product having a second size in second, successive moving and depositing steps.

21. The method of claim 16, further including building a second load with second product having a second size, different than the size of the first product, wherein when building the second load, a controller repeats the same single logic sequence.

22. The method of claim 16, further including sensing a desired location of the product and placing the product on the load.

23. The method of claim 16, wherein moving and depositing the product includes executing the single logic sequence in a controller, and repeating the single logic sequence for at least two consecutive transporting cycles.

24. The method of claim 16, wherein determining when the load is completely built includes monitoring at least two of a length, a width, and a height sensor for a signal indicating that at least two of a desired length, a desired width, and a desired height of the load are reached; and
    receiving the signal from the at least two monitored sensors at a controller.

25. The method of claim 24, wherein the controller includes more than one processor.

26. A method of building a load with product from an infeed area, the method comprising:
    defining a desired area of the load to be filled;
    automatically transporting product to the desired area of the load;
    automatically repeating the transporting step by repeating a single logic sequence for at least two consecutive transporting cycles; and
    automatically determining when the load is completely built using at least two of a height sensor, a length sensor, and a width sensor.

27. The method of claim 26, wherein defining a desired area includes positioning first and second sensors to define the desired area.

28. The method of claim 26, wherein the first and second sensors are one of the following sets of sensors: height and width sensors; height and length sensors; and length and width sensors.

29. The method of claim 26, further including repeating the single logic sequence for each transporting cycle of the load.

30. The method of claim 26, wherein the single logic sequence is defined in computer executable code configured to be executed by a processor.

31. The method of claim 26, wherein automatically repeating the transporting step includes loading a first product having a first size onto a load and loading a second product having a second size onto the same load.

32. The method of claim 26, wherein repeating the single logic sequence for at least two consecutive transporting cycles includes:
   transporting a first product having a first size in a first transporting cycle; and
   transporting a second product having a second size in second, successive transporting cycle.

33. The method of claim 26, further including building a second load with second product having a second size, different than the size of the first product, wherein when building the second load, a controller repeats the same single logic sequence.

34. The method of claim 26, wherein transporting the product includes executing the single logic sequence in a controller, and repeating the single logic sequence for at least two consecutive transporting cycles.

35. The method of claim 26, wherein determining when the load is completely built includes monitoring at least two of a length, a width, and a height sensor for a signal indicating that at least two of a desired length, a desired width, and a desired height of the load are reached; and
   receiving the signal from the at least two monitored sensors at a controller.

36. A method of building a load with product from an infeed area, the method comprising:
   defining a desired area of a load to be filled with product using at least two of a height sensor, a length sensor, and a width sensor;
   automatically filling the desired area with product by executing a first logic sequence in a controller, and repeating the first logic sequence for at least two transporting cycles, and executing a second logic sequence in the controller for a different transporting cycle while building the load; and
   determining when the desired area is filled using at least two of the height sensor, the length sensor, and the width sensor.

37. A method of building a load with product from an infeed area of a palletizer, the method comprising:
   defining a desired area of a load to be filled with product using a height sensor and at least one of a length sensor and a width sensor, wherein using the height sensor includes positioning the height sensor to set a desired height of the load;
   automatically filling the desired area with product; and
   determining when the desired area is filled.

38. The method of claim 37, wherein defining the desired area further includes positioning at least one of the length sensor and the width sensor to define a respective length or width of the desired area.

39. A method of building a load with product from an infeed area, the method comprising:
   automatically moving a product from the infeed area to a load building area;
   automatically depositing the product on the load;
   automatically repeating the moving and depositing steps by repeating a single logic sequence for at least two consecutive moving and depositing steps;
   wherein the first moving and first depositing steps load a first product having a first size onto the load, and wherein the second moving and second depositing steps load a second product having a second size different from the first size onto the load; and
   automatically determining when the load is completely built.

40. The method of claim 39, further including building a second load with the second product having the second size, different than the size of the first product, wherein when building the second load, a controller repeats the same single logic sequence.

41. A method of building a load with product from an infeed area of a palletizer, the method comprising:
   defining a desired space to be filled with product by physically establishing at least two of a height threshold, a length threshold, and a width threshold;
   automatically filling the desired space with product; and
   automatically signaling that the desired space is filled when product reaches at least two of the height threshold, the length threshold, and the width threshold.

42. The method of claim 41, wherein defining a desired space to be filled with product further includes defining a desired area of a load to be filled with product.

43. The method of claim 41, wherein physically establishing at least two of a height threshold, a length threshold, and a width threshold includes positioning at least two of a height detector, a length detector, and a width detector.

44. The method of claim 41, wherein defining a desired space of a load to be filled with product further includes defining a desired volume of a load to be filled with product.

45. A method of building a load with product from an infeed area of a palletizer, the method comprising:
   defining boundaries of a desired area of a load to be filled with product by physically establishing at least two of a load height, a load length, and a load width;
   automatically filling the desired area with a quantity of product; and
   automatically signaling when the desired area is filled when product reaches at least two of the load height, the load length, and the load width.

46. The method of claim 45, wherein automatically filling includes filling with products of various sizes, and wherein variation in product size does not alter the at least two physically established load height, load length, and load width.

47. The method of claim 45, wherein automatically filling the desired area with a quantity of product includes filling the desired area with one or more rows of product to form a layer of product.

48. The method of claim 47, wherein the load width is unaffected by the quantity of rows used to form the layer.

49. The method of 45, wherein automatically filling the desired area with a quantity of product includes filling the desired area with one or more layers of product to form the load.

50. The method of claim 49, wherein the load height is unaffected by the quantity of layers used to form the load.

51. The method of claim 45, wherein defining boundaries of a desired area of a load to be filled with product further includes physically defining the load height, the load length, and the load width to define boundaries of a desired load volume.

52. A method of building a load with product from an infeed area of a palletizer, the method comprising:
    defining a desired area of a load to be filled with product by establishing physical markers delimiting at least two of a load height, a load length, and a load width;
    automatically filling the desired area with product; and
    automatically signaling when the desired area is filled when product reaches at least two of the load height, the load length, and the load width.

53. The method of claim 52, wherein automatically filling the desired area with product includes varying the size of product used to fill the desired area without altering the desired area.

54. The method of claim 52, wherein automatically filling the desired area with product further includes filling the desired area with a plurality of rows of product to form a layer of product, and wherein each row has a row width.

55. The method of claim 54, wherein the load width is unaffected by variations in row width between each row.

56. The method of claim 52, wherein automatically filling the desired area with product further includes filling the desired area with a plurality of layers of product to form the load, and wherein each layer has a layer height.

57. The method of claim 56, wherein the load height is unaffected by variations in layer height between each layer.

58. The method of claim 52, wherein defining a desired area of a load to be filled with product further includes establishing physical boundaries delimiting the load height, the load length, and the load width to define a desired load volume.

59. A method of building a load with product from an infeed area of a palletizer, the method comprising:
    defining a boundary to be filled in with product by physically setting at least two of a height dimension, a length dimension, and a width dimension of the load;
    automatically filling in the boundary with product, wherein the height dimension, the length dimension, and the width dimension of the load remain substantially constant as product characteristics vary; and
    automatically signaling that the boundary is filled in when product reaches at least two of the height dimension, the length dimension, and the width dimension of the load.

60. The method of claim 59, wherein automatically filling in the boundary with product includes filling in the boundary with a plurality of rows of product having varying row widths.

61. The method of claim 59, wherein automatically filling in the boundary with product includes filling in the boundary with a plurality of layers of product having varying layer heights.

62. The method of claim 59, wherein defining a boundary to be filled in with product includes defining an area to be filled in with product by physically setting two of the height dimension, the length dimension, and the width dimension.

63. The method of claim 59, wherein defining a boundary to be filled in with product includes defining a volume to be filled in with product by physically setting the height dimension, the length dimension, and the width dimension.

64. A method of building loads with product from an infeed area of a palletizer, the method comprising:
    defining a boundary of a desired area of a first load to be filled with product of a first size by physically delineating at least two of a desired height of the first load, a desired length of the first load, and a desired width of the first load;
    automatically filling the desired area with as much product of the first size as needed to meet the boundary;
    moving the first load away; and
    automatically filling the desired area with as much product of a second size different from the first size as needed to meet the boundary without adjusting the boundary.

65. The method of claim 64, wherein defining a boundary of a desired area of a first load further includes physically delineating the desired height of the first load, the desired length of the first load, and the desired width of the first load, to define a boundary of a desired volume.

* * * * *

UNITED STATES PATENT AND TRADEMARK OFFICE
CERTIFICATE OF CORRECTION

| | |
|---|---|
| PATENT NO. | : 8,145,350 B2 |
| APPLICATION NO. | : 10/696736 |
| DATED | : March 27, 2012 |
| INVENTOR(S) | : Patrick R. Lancaster, III et al. |

It is certified that error appears in the above-identified patent and that said Letters Patent is hereby corrected as shown below:

IN THE SPECIFICATIONS:

Column 1, Lines 50-51, reads "building the load requires that product units to be placed in assigned locations" and should read -- building the load requires that product units be placed in assigned locations --.

Column 3, Line 28, reads "the invention is directed a method of" and should read -- the invention is directed to a method of --.

Column 4, Line 11, reads "it includes means for" and should read -- It includes means for --.

Column 5, Line 31, reads "FIGS. 9A and 9B are a flow charts for" and should read -- FIGS. 9A and 9B are flow charts for --.

Column 6, Lines 61-63, reads "Movement of...maybe accomplished using" and should read -- Movement of...may be accomplished using --.

Column 9, Lines 26-27, reads "the positions of...is for" and should read -- the positions of...are for --.

Column 11, Lines 9-10, reads "enough product units 118 to...is located" and should read -- enough product units 118 to...are located --.

Column 11, Lines 38-39, reads "mast upper limit sensor 160 disposed on..., and indicates the" and should read -- mast upper limit sensor 160 is disposed on..., and indicates the --.

Column 12, line 44, reads "It is also shows" and should read -- It also shows --.

Column 15, line 36, reads "when either of these sensors are activated" and should read -- when either of these sensors is activated --.

Signed and Sealed this
Twenty-sixth Day of June, 2012

David J. Kappos
*Director of the United States Patent and Trademark Office*

Column 16, Line 11, reads "product units 118 on...is" and should read -- product units 118 on...are --.

Column 16, Line 50, reads "may be positioned to detect the position of previously product on a load as the clamp 104." and should read -- may be positioned to detect the position of previously placed product on a load as the clamp 104 is moved. --.

Column 17, Line 24, reads "downward from the a" and should read -- downward from a --.

Column 18, Line 7, reads "as describe above with reference to" and should read -- as described above with reference to --.

IN THE CLAIMS:

Column 21, Lines 55-56, Claim 11, reads "at least two of a desired height, length, and width of the load is reached." and should read -- at least two of a desired height, length, and width of the load are reached." --.

Column 23, Line 4, Claim 28, reads "The method of claim 26, wherein" and should read -- The method of claim 27, wherein --.

Column 23, lines 22-23, Claim 32, reads "product having a second size in second, successive transporting cycle." and should read -- product having a second size in a second, successive transporting cycle. --.